(12) United States Patent
Kakii

(10) Patent No.: US 7,809,945 B2
(45) Date of Patent: Oct. 5, 2010

(54) EXAMINATION APPARATUS, COMMUNICATION SYSTEM, EXAMINATION METHOD, COMPUTER-EXECUTABLE PROGRAM PRODUCT, AND COMPUTER-READABLE RECORDING MEDIUM

(75) Inventor: Hiroshi Kakii, Hino (JP)

(73) Assignee: Ricoh Company, Ltd., Tokyo (JP)

( * ) Notice: Subject to any disclaimer, the term of this patent is extended or adjusted under 35 U.S.C. 154(b) by 1082 days.

(21) Appl. No.: 10/572,382

(22) PCT Filed: Jul. 20, 2005

(86) PCT No.: PCT/JP2005/013675

§ 371 (c)(1),
(2), (4) Date: Mar. 16, 2006

(87) PCT Pub. No.: WO2006/009288

PCT Pub. Date: Jan. 26, 2006

(65) Prior Publication Data

US 2007/0055865 A1    Mar. 8, 2007

(30) Foreign Application Priority Data

Jul. 20, 2004  (JP) .............................. 2004-211760
Jun. 27, 2005  (JP) .............................. 2005-187405

(51) Int. Cl.
*H04L 9/00* (2006.01)

(52) U.S. Cl. ........................ 713/168; 713/156; 713/158; 726/2; 380/229; 380/247

(58) Field of Classification Search .................. 713/156, 713/157, 158, 161, 168, 175; 726/2; 380/229, 380/247, 270
See application file for complete search history.

(56) References Cited

U.S. PATENT DOCUMENTS 7,123,721 B2 * 10/2006 Panjwani et al. ............ 380/270

FOREIGN PATENT DOCUMENTS

| JP | 2002-190796 | 7/2002 |
|----|-------------|--------|
| JP | 2002-215826 | 8/2002 |
| JP | 2002-251492 | 9/2002 |
| JP | 2002-353959 | 12/2002 |
| JP | 2003-058050 | 2/2003 |
| JP | 2003-348068 | 12/2003 |
| JP | 2004-94690  | 3/2004 |

* cited by examiner

*Primary Examiner*—Kimyen Vu
*Assistant Examiner*—Baotran N To
(74) *Attorney, Agent, or Firm*—Oblon, Spivak, McClelland, Maier & Neustadt, L.L.P.

(57) ABSTRACT

An examination apparatus includes a receiving part, an acquisition part, and an examination part. The receiving part receives a public key certificate and identification information of the communication device from the device, which conduct the authentication process by using the public key encryption and sends the public key certificate used for the authentication process only to a specific communication partner. The acquisition part acquires information showing the public key certificate corresponding to the identification information, from a location other than the device based on the identification information. And, the examination part examines the device based on whether or not the public key certificate received by the receiving part is proper, by referring to the information acquired by the acquisition part.

14 Claims, 27 Drawing Sheets

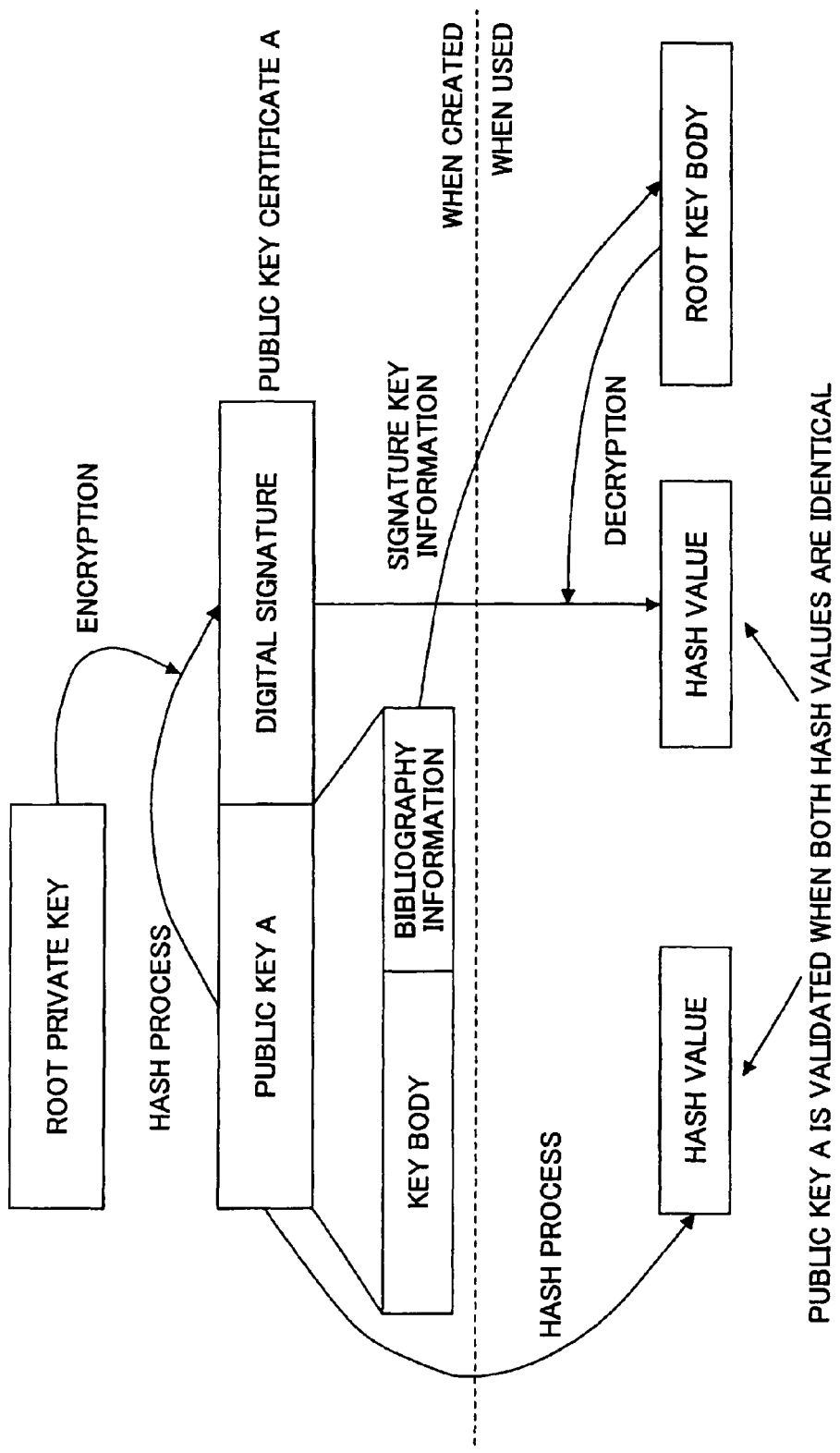

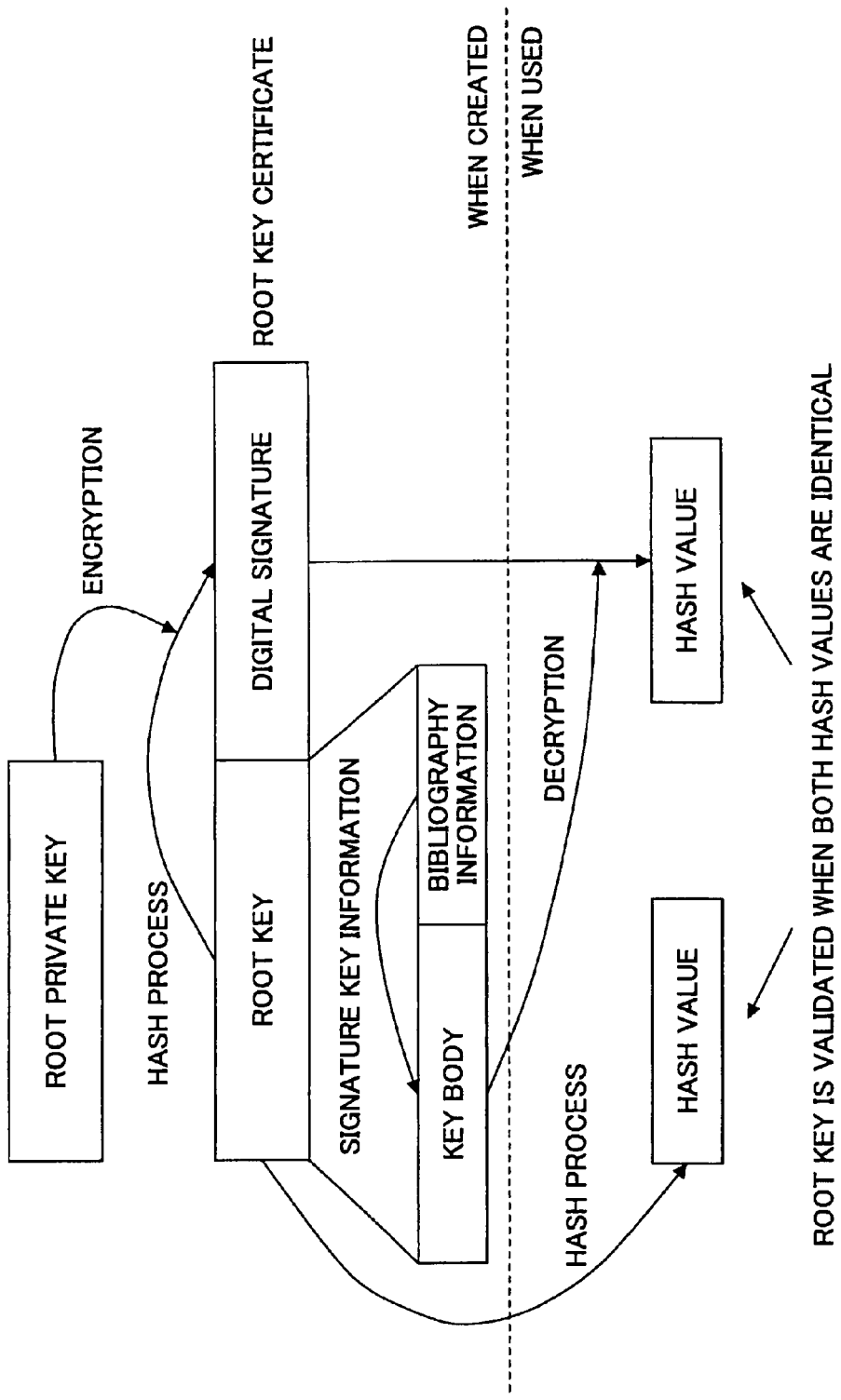

FIG.7

| | CALL ACQUISITION | PERIODICAL NOTICE ACQUISITION | CERTIFICATE DEFINITION | COMMAND EXECUTION |
|---|---|---|---|---|
| RESCUE AUTHENTICATION INFORMATION | × | × | ○ | × |
| OFFICIAL AUTHENTICATION INFORMATION | ○ | ○ | ○ | ○ |

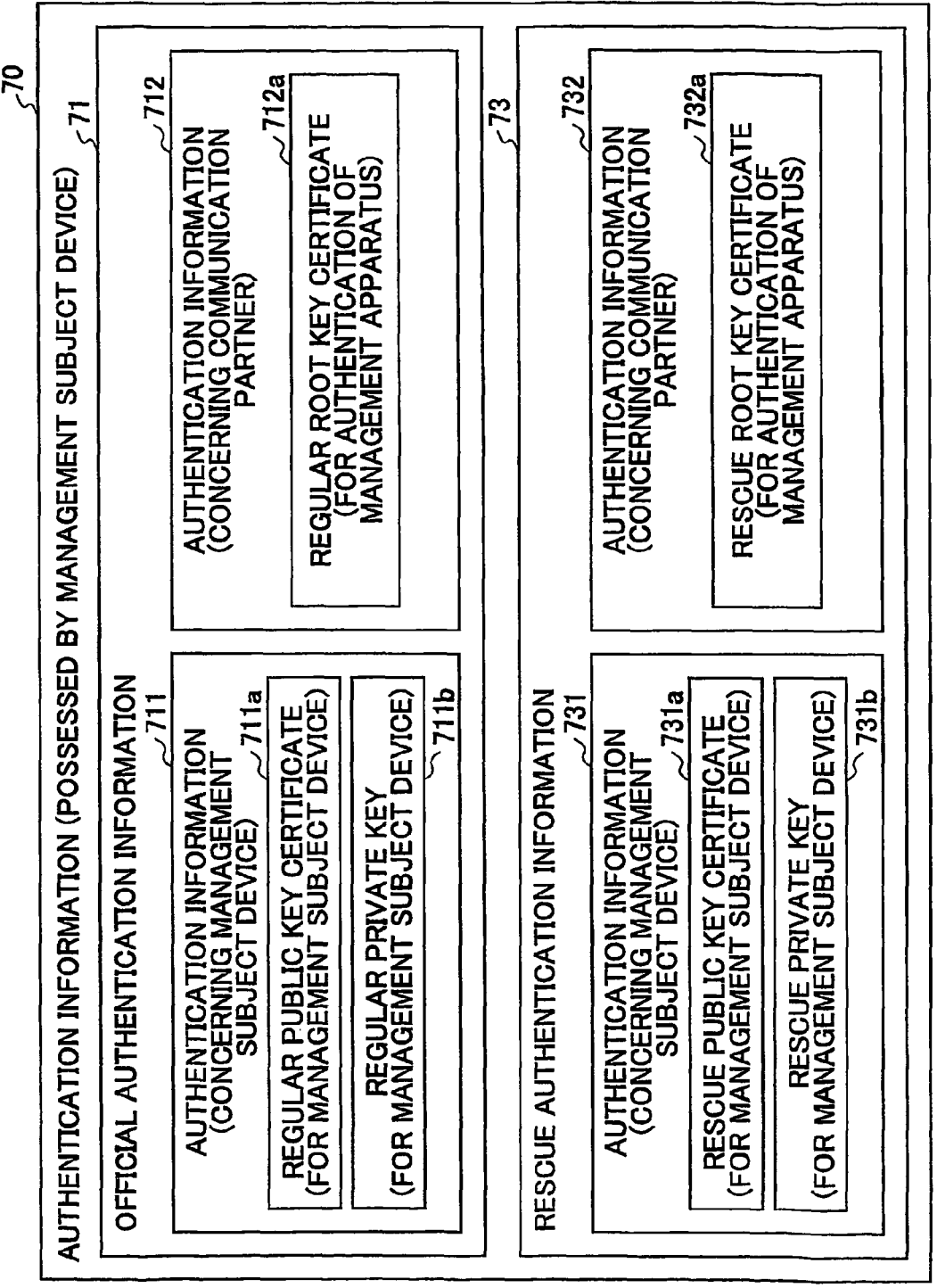

FIG.9

```
Data (DATA PART)
  Version (VERSION OF X509)
  Serial Number (SERIAL NUMBER)
  Signature Algorithm (ENCRYPTION ALGORITHM USED BY CA)
  Issuer (ISSUER OF CERTIFICATE)
  Validity (VALID TERM)
  Subject (SUBJECT TO BE CERTIFIED)
  Subject Public Key Info (INFORMATION CONCERNING PUBLIC
                           KEY OF SUBJECT TO BE CERTIFIED)
    Public Key Algorithm (ALGORITHM OF PUBLIC KEY)
    RSA Public Key (PUBLIC KEY)
  X509v3 extensions (EXTENSION PART OF X509 VERSION3)
   ...
Signature Algorithm (ENCRYPTION ALGORITHM USED BY CA)
Signature (DIGITAL SIGNATURE BY CA)
```

FIG.10

Data:
  Version: 3 (0x2)
A — Serial Number: 101 (0x0)
  Signature Algorithm: md5WithRSAEncryption
B — Issuer: C=JP, ST=Tokyo, L=Ohtaku, O=XXX Company, Ltd, CN=CA001
  Validity
C {  Not Before: May 20 00:00:00 2002 GMT
     Not After : May 20 00:00:00 2003 GMT
D — Subject: C=JP, Tokyo, L=Ohtaku, O=XXX Company, Ltd, C\=Device-0123456
  Subject Public Key Info:
    Public Key Algorithm: rsaEncryption
    RSA Public Key: (1024 bit)
    Modulus (1024 bit):
E — ⎯⎯ PUBLIC KEY OF Device-0123456

Exponent: 65537 (0x10001)
Signature Algorithm: md5WithRSAEncryption
Signature: ⎯⎯ DIGITAL SIGNATURE DATA BY MANAGEMENT APPARATUS

FIG.11

```
Data:
    Version: 3 (0x2)
    Serial Number: 0 (0x0)
    Signature Algorithm: md5WithRSAEncryption
F ──Issuer: C=JP, ST=Tokyo, L=Ohtaku, O=XXX Company, Ltd, CN=RescueCA
    Validity
        Not Before: Jan 1 00:00:00 2000 GMT
        Not After : Jan 1 00:00:00 2050 GMT
G ──Subject: C=JP, Tokyo, L=Ohtaku, O=XXX Company, Ltd, CN=0
    Subject Public Key Info:
        Public Key Algorithm: rsaEncryption
        RSA Public Key: (1024 bit)
            Modulus (1024 bit):             ┌──────────────────────────┐
                                            │ PUBLIC KEY OF Device-0123456 │
                                            └──────────────────────────┘
            Exponent: 65537 (0x10001)
Signature Algorithm: md5WithRSAEncryption
Signature:                                  ┌────────────────────────────────────────────┐
                                            │ DIGITAL SIGNATURE DATA BY RESCUE CA OF CA AGENT │
                                            └────────────────────────────────────────────┘
```

FIG.13

REGULAR PUBLIC KEY CERTIFICATE FOR MANAGEMENT SUBJECT DEVICE

REGULAR PRIVATE KEY FOR MANAGEMENT SUBJECT DEVICE

REGULAR ROOT KEY CERTIFICATE FOR AUTHENTICATION OF MANAGEMENT APPARATUS

FIG.15

| DEVICE NUMBER | SERIAL NUMBER OF PUBLIC KEY CERTIFICATE | ISSUED DATE |
|---|---|---|
| Device-0123456 | 0 | Jan 1 00:00:00 2003 GMT |
| Device-0123457 | 1 | Jan 1 00:00:01 2003 GMT |
| Device-0123458 | 2 | Jan 1 00:00:02 2003 GMT |
| ⋮ | ⋮ | ⋮ |

FIG.16

| SERIAL NUMBER OF PUBLIC KEY CERTIFICATE | CONTENTS OF PUBLIC KEY CERTIFICATE |
|---|---|
| 0 | REGISTER CERTIFICATE SHOWN IN FIG.10 AS IT IS |
| 1 | REGISTER CERTIFICATE CORRESPONDING TO ID AS IT IS |
| 2 | REGISTER CERTIFICATE CORRESPONDING TO ID AS IT IS |
| ⋮ | ⋮ |

EXAMINATION APPARATUS, COMMUNICATION SYSTEM, EXAMINATION METHOD, COMPUTER-EXECUTABLE PROGRAM PRODUCT, AND COMPUTER-READABLE RECORDING MEDIUM

TECHNICAL FIELD

The present invention generally relates to examination apparatuses, examination methods, communication systems, computer-executable program products, and computer-readable recording media, and more particularly to an examination apparatus and an examination method for examining a communication device for conducting an authentication process using a public key encryption, a communication system including an examination apparatus for examining a communication device and the communication device being an examination subject, and a computer-executable program product for causing a computer to function as an examination apparatus for examining a communication device, and a computer-readable recording medium recorded with a program to cause a computer to function as an examination apparatus for examining a communication device.

BACKGROUND ART

Conventionally, Conventionally, a plurality of communication devices each having a communication function are mutually connected through a network so as to architect various systems. As an example, a system so-called "electronic commerce system" has been architected so that a computer such as a PC (personal computer) or a like functioning as a client terminal sends an order of a product and a server computer connecting to the client terminal through the Internet accepts that order. In addition, a system is proposed in that a function of the client terminal or the server computer is implemented to various electronic apparatuses, and the electronic apparatuses are connected to each other through a network, to conduct a remote management of the electronic apparatuses by intercommunications.

In order to architect this system, it is important to check whether a communication partner is a proper partner or whether information sent from the communication partner is tampered with when communicating with the communication partner. In addition, particularly in the Internet, the information generally passes through irrelevant computers toward the communication partner. When confidential information is transmitted, it is necessary to protect contents of the confidential information. Then, as a communication protocol corresponding to this requirement, for example, a protocol called an SSL (Secure Socket Layer) has been developed, and widely used. In communication using this protocol, it is possible to prevent falsification and interception by encrypting the confidential information in addition to combining a public key encryption method and a shared key encryption method and authenticating the communication partner. Also, at a side of the communication partner, it is possible to authenticate a device as a communication originator requesting communication.

Japanese Laid-Open Patent Applications No. 2002-353959 and No. 2002-251492 disclose technologies related to an authentication using the SSL and the public key encryption.

In the following, a communication procedure in a case of conducting a mutual authentication in accordance with the SSL will be described while focusing on a portion of the authentication process. FIG. 1 is a diagram showing a flow-chart conducted by each of communication devices A and B when the communication devices A and B conduct a mutual authentication in accordance with the SSL, accompanying with information used in each process.

As shown in FIG. 1, when the mutual authentication is conducted in accordance with the SSL, it is necessary for the communication devices A and B to store a combination of a root key certificate and a private key and a combination of the root key certificate and a public key certificate, respectively. The private key is a key which a CA (Certificate Authority) issues for each of the communication devices A and B. The public key certificate is a digital certificate in that the CA additionally provides a digital signature to the public key corresponding to the private key. Also, the root key certificate is a digital certificate in which the CA additionally provides the digital signature to a root key corresponding to a root private key used for the digital signature.

FIG. 2A and FIG. 2B show their relationships.

As shown in FIG. $2A_1$, a public key A includes a key body for decrypting a document which is encrypted by using a private key A, and bibliography information including information concerning an issuer (CA) of the public key, a valid term, and a like. In order to show that the key body and the bibliography information are not tampered, the CA encrypts a hash value obtained by conducting a hash process with respect to the public key A, by using the root private key, and additionally provides the hash valued being encrypted as digital signature to the public key of a client. Also, in this case, identification information of the root private key used for the digital signature is additionally provided to the bibliography information of the public key A as signature key information. Accordingly, the public key certificate to which this digital signature is provided is a public key certificate A.

In a case of using the public key certificate A for the authentication process, the digital signature included in the public key certificate A is decoded by using the key body of the root key as the public key corresponding to the root public key. When this decryption is normally conducted, it is recognized that the digital signature is surely provided by the CA. Moreover, if a hash value obtained by conducting the hash process with respect to the portion of the public key A is identical to a hash value obtained from the decryption, it is recognized that the key itself is not suffering from compromised and tampered.

Also, if received data is normally decrypted by using the public key A, it is recognized that the received data is surely sent from an owner of the private key A.

In order to conduct the authentication process, it is necessary to store the root key beforehand. As shown in FIG. 2B, the root key is also stored as the root key certificate to which the CA provides the digital signature. In this case, the root key certificate is a self-signature format in which the digital signature can be decrypted with the public key included in the root key certificate itself. When the root key is used, the digital signature is decrypted by using the key body included in the root key certificate, and the root key is compared with the hash value obtained by the hash process. If the root key is identical to the hash value, it can be confirmed that the root key is not compromised.

Each of the flowcharts shown in FIG. 1 will be described. It should be noted that arrows between two flowcharts denote data transmission. A sender side conducts a transmission process in a step at a start point of the arrow, and a receiver side conducts a process in a step at an end point of the arrow when the receiver side receives data from the sender side. Moreover, if a process in each step is not normally ended, a response showing an authentication failure is returned to the communication partner and the process is terminated in that step. When the authentication failure is received from the communication partner, or when the process is timed out, similarly, the response showing an authentication failure is returned to the communication partner and the process is terminated in that step.

In this case, the communication device A sends a request to the communication device B in order to communicate therewith. In a case of conducting the communication request, a CPU of the communication device A starts a process in accordance with the flowchart shown at a left side in the FIG. 1 by executing a predetermined control program. Then, the communication device A sends a communication request to the communication device B in step S211.

On the other hand, when a CPU of the communication device B receives the communication request, the communication device B starts a process in accordance with the flowchart shown at a right side in FIG. 1 by executing a predetermined control program. In step S221, a first random number is generated, and is encrypted by using the private key B. Then, in step S222, the first random number being encrypted and the public key certificate B are sent to the communication device A.

At the communication device A, when the first random number being encrypted and the public key certificate B are received, validity of the public key certificate B is confirmed by using the root key certificate in step S212.

When the validity is confirmed, the first random number is decrypted by using the public key B included in the public key certificate B received from the communication device B in step S213. If the first random number is successfully decrypted, it can be confirmed that the first random number is surely received from an issuance subject of the public key certificate B.

After that, a second random number other than the first random number and a seed of a shared key are generated in step S214. For example, the seed of the shared key can be created based on data exchanged with the communication device B during the intercommunication. Then, the second random number is encrypted by using the private key A and the seed of the shared key is encrypted by using the public key B in step S215. In step S216, the second random number and the seed of the shared key are sent with the public key certificate A to the communication device B. The seed of the shared key is encrypted, so that any device other than the communication partner cannot recognize the seed of the shared key.

Moreover, in step S217 following to the step S216, a shared key is generated from the seed of the shared key generated in the step S214, in order to use to encrypt for further communications.

At the communication device B, when data sent from the communication device A in step S216 is received, the validity of the public key certificate A is confirmed by using the root key certificate in step S223. When the validity is confirmed, the second random number is decrypted by using the public key A included in the public key certificate A received from the communication device A in step Ξ224. When the second random number is successfully decrypted, it can be confirmed that the second random number is surely received from an issuance subject of the public key certificate A.

After that, in step S225, the seed of the shared key is decrypted by using the private key B. By processes previously conducted, the communication device A and the communication device B share the seed of the shared key with each other. Also, the seed of the shared key cannot be known to any device other than the communication device A which generated the seed of the shared key and the communication device B which possesses the private key B. When the above conducted processes are successful, the shared key is generated from the seed of the shared key decrypted and obtained in step S226, in order to use for further communications.

Subsequently, when a process in the step S217 at the communication device A and a process in the step S226 at the communication device B are completed, the communication devices A and B mutually confirm the successful authentications and an encryption method for the further communications. Accordingly, the communication devices A and B start to communicate with each other in accordance with the encryption method by using the shared key generated at each side of the communication devices A and B, and terminate the processes concerning the authentication. While the communication devices A and B mutually confirm the successful authentications and an encryption method for the further communications, the communication devices A and B send a response showing the successful authentication. By the above-described process, the communication devices A and B establish communication with each other. In the following communications, the communication devices A and B use the shared key generated in the step S217 and S226, respectively, and can communicate with each other by encrypting data in the encryption method using the shared key.

By conducting the above-described processes, the communication devices A and B authenticate each other first, and then share the shared key so as to establish a path to securely communicate with each other.

In a case of applying a one-way authentication, for example, if only the communication device B may authenticate the communication device A, it is possible to omit the encryption of the first random number and the transmission of the first random number-in the authentication process shown in FIG. 1. In this case, in order to securely send the seed of the shared key from the communication device A to the communication device B, an encryption using the public key B of the communication device B may be conducted, but it is not necessary to confirm the validity of the digital signature attached to the public key B. Accordingly, the authentication in this case can be simplified as shown in FIG. 3. That is, the steps S212 and S213 at the communication device A are not required, and the step S221 at the communication device B is not required. Also, other processes can be partially simplified.

In the above-described authentication process, contents being encrypted with the public key are decrypted by only a device having the private key corresponding to the public key, and contents being encrypted with the private key are decrypted with only the public key corresponding to the private key. Due to this feature, the communication partner authenticates that the public key certificate describes the device as an issuance destination (or the public key certificate describes a user as the issuance destination).

Japanese Laid-Open Patent Applications No. 2003-348068 (paragraph 0004) and No. 2002-190796 disclose technologies related to a management of the public key used for the authentication process.

The Japanese Laid-Open Patent Application No. 2003-348068 discloses to implement a key registration device on a network and to manage a public key, so as to reduce a workload of a user.

The Japanese Laid-Open Patent Application No. 2002-190796 discloses to automatically register necessary public keys only to a public key database of an electronic mail apparatus and to automatically manage so as to maintain only valid public keys in a case of using a public key encryption in order to encrypt an electronic mail.

However, in a public key encryption method, disadvantageously, the private key can be obtained from the public key if spending sufficient time depending on a key length. Accordingly, if the private key is recognized, a third party can pretend to be an owner of the private key. Thus, reliability of the authentication and security of the communication cannot be maintained. Thus, the number of users, who applies a security policy of providing a validated date and update a key set at predetermined period as described above, increases. Therefore, for example, in a case of providing the remote management system using the mutual authentication as described above, it is required to guarantee to a customer that the key can be updated.

As a method for distributing a new public key certificate to update to a communication device, which is to be authenticated by using the public key certificate, the CA issues a new public key certificate and a new private key to the communication device before the validated date of the public key certificate in use is expired, and the CA or a management apparatus taking the place of the CA send and set the root key certificate in addition to the public key certificate and the private key to a device of an update subject through a communication path using the SSL, which is established by using the public key certificate in use.

In this manner, the communication device can automatically update the public key certificate and the like used for the authentication before the validated date is expired. Therefore, without any trouble to the user of the communication device, it is possible to maintain the communication device to be in a state possible for the authentication. Moreover, in a case of conducting a transmission through the Internet, it is possible to conduct the transmission of the public key certificate and the like while maintaining the communication path to be secured.

However, even though the communication path is maintained to be secured by using the SSL, in a case of communication through the Internet, since information may be transferred through several servers, a possibility of spying and falsifying of the information to transfer cannot be completely eliminated. If the private key is spied, spoofing can be possible. Thus, it is desired to eliminate a risk such as spoofing even if the risk has less possibility.

However, in this case, if a means for acquiring an emergency communication path between the communication device and the CA or the management apparatus is provided to the communication device, it is possible to obtain a new public key certificate to establish a regular communication path through the emergency communication path.-As this emergency communication path, for example, a public key certificate having longer validated date, a private key corresponding to the public key certificate, and a root key certificate may be stored in devices produced by the vendor and shared with each other, and the communication path using the SSL can be established between each device and the CA or the management apparatus.

Regarding this technology, the applicant of the present invention filed Japanese Patent Application No. 2003-341329, which has not been published at the present time.

This emergency communication path is not normally used. However, even if a regular communication path has something wrong, this emergency communication path is required to be secured. Thus, it is difficult to conduct an authentication process rigidly similar to the regular communication path. For example, in a case of storing the shared public key certificate to each device as described above, since the identification information of each device cannot be described in the public key certificate. As a result, it is not possible to refer to the identification information of each device when the authentication process is conducted by using SSL. Thus, the CA or the management apparatus causes the communication device to send the identification information after the communication path is established, relies on the identification information, and sends an update public key certificate and a like to the communication device.

Accordingly, regarding the emergency communication path, there is a problem in that it is relatively easy to disguise to be a proper communication device to acquire the update public key certificate. Therefore, even in a case of using the emergency communication path, that is, even in a case in that the regular communication path is not used, it is desired to effectively prevent from spoofing.

Regarding this point, the above-described patent documents do not disclose an update of the public key certificate in a sate in that the pubic key certificate being regularly used cannot be used.

Moreover, for reasons of production equipment and a like, like the emergency public key certificate, it is necessary to set the shared public key certificate for each device with respect to the public key certificate being regularly used. In this case, similar to a case of using the emergency communication path, even if the public key certificate being regularly used is updated within a valid term, it is desired to effectively prevent from spoofing.

DISCLOSURE OF THE INVENTION

It is a general object of the present invention to provide examination apparatuses, examination methods, communication systems, computer-executable program products, and computer-readable recording media, in which the above-mentioned problems are eliminated.

A more specific object of the present invention is to provide examination apparatuses, examination methods, communication systems, computer-executable program products, and computer-readable recording media, and more particularly to an examination apparatus and an examination method for examining a communication device for conducting an authentication process using a public key encryption, a communication system including an examination apparatus for examining a communication device and the communication device being an examination subject, and a computer-executable program product for causing a computer to function as an examination apparatus for examining a communication device, and a computer-readable recording medium recorded with a program to cause a computer to function as an examination apparatus for examining a communication device, in which it is possible to effectively prevent from spoofing in a case in that it is required to identify the communication device by using a public key certificate being a relatively lower security.

The above objects of the present invention are achieved by an examination apparatus for examining a communication device for conducting an authentication process by using a public key encryption, said examination apparatus including: a receiving part receiving a public key certificate of the communication device and identification information of the communication device from the communication device, which conducts the authentication process by using the public key encryption and sends the public key certificate used for the authentication process only to a specific communication partner; an acquisition part acquiring information showing contents of the public key certificate corresponding to the identification information-received by the receiving part, from a location other than the communication device based on the identification information; and an examination part examining the communication device based on whether or not the public key certificate received by the receiving part is proper, by referring to the information acquired by the acquisition part.

In the examination apparatus, the examination part may include a part determining whether or not the public key certificate is proper based on whether or not contents of the public key certificate received by the receiving part are identical to the information acquired by the acquisition part.

Moreover, the above objects of the present invention are achieved by an examination apparatus for examining a communication device for conducting an authentication process by using a public key encryption, said examination apparatus including: a receiving part receiving a private key of the communication device, and identification information of the communication device from the communication device conducting the authentication process using the public key encryption; an acquisition part acquiring a public key corresponding to the identification information received by the receiving part from a location other than the communication device based on the identification information; and an examination part examining the communication device based on whether or not the public key acquired by the acquisition part corresponds to the private key received by the receiving part.

The examination apparatus may further includes a part storing a correspondence between the identification information of the communication device and a public key used for the authentication process.

In the examination apparatus, the examination part may include a part encrypting given data by using either one of the public key acquired by the acquisition part and the private key received by the receiving part, decrypting data encrypted by another one of the public key and the private key, and conducting the examination based on a decryption result.

The examination apparatus may further include sending part sending the public key certificate as a new public key certificate of the communication device to the communication device, when the communication device passes the examination by the examination part.

In the examination apparatus, the public key certificate sent by the sending part may be a public key certificate including the identification information of the communication device received by the receiving part.

Furthermore, the above objects of the present invention are achieved by a communication system, including: a communication device; and an examination apparatus, wherein: the communication device includes: an authentication part conducting an authentication process by using a public key-encryption and sending a public key certificate used for the authentication process only to a specific partner; and a sending part sending a public key certificate of the communication device itself and identification information of the communication device itself to the examination apparatus, and the examination apparatus includes: a receiving part receiving the public key certificate of the communication apparatus and the identification information of the communication apparatus; an acquisition part acquiring information showing contents of the public key certificate corresponding to the identification information received by the receiving part from a location other than the communication device by referring to the identification information; and an examination part examining the communication device based on whether or not the public key certificate received by the receiving part is proper, by referring to the information acquired by the acquisition part.

In the communication system, the examination part of the examination apparatus may include a part determining whether or not the public key certificate is proper based on whether or not contents of the public key certificate received by the receiving part are identical to the information acquired by the acquisition part.

Moreover, the above objects of the present invention are achieved by a communication system, including: a communication device; and an examination apparatus, wherein: the communication device includes: an authentication part conducting an authentication-process by using a public key encryption; and a sending part sending a private key of the communication device itself and identification information of the communication device itself to the examination apparatus, and the examination apparatus includes: a receiving part receiving the private key of the communication device and the identification information of the communication device; an acquisition part acquiring a public key corresponding to the identification information received from the receiving part from a location other than the communication device based on the identification information; and an examination part examining the communication device based on whether or not the public key acquired by the acquisition part corresponds to the private key received by the receiving part.

In the communication system, the examination apparatus further includes a part storing a correspondence between the identification information of the communication device and the public key used by the communication device for the authentication process.

Moreover, in the communication system, the examination part of the examination apparatus includes a part encrypting given data by using either one of the public key acquired by the acquisition part and the private key received by the receiving part, decrypting data encrypted by another one of the public key and the private key, and conducting the examination based on a decryption result.

In the communication system, the examination apparatus may further includes a sending part sending the public key certificate as a new public key certificate of the communication device to the communication device when the communication device passes an examination by the examination part; and the communication device further comprises a part receiving the public key certificate.

In the communication system, the public key certificate sent from the sending part of the examination apparatus may be a public key certificate including the identification information of the communication device received by the receiving part.

In the communication system, in the communication device, the public key certificate and the private key used for the authentication process may be separately stored in a plurality of memory units being replaceable.

Furthermore, the above objects of the present invention are achieved by an examination method for examining a communication device for conducting an authentication process by using a public key encryption, said examination method comprising the steps of: receiving a public key certificate of the communication device and identification information of the communication device from the communication device, which conducts the authentication process by using the public key encryption and sends the public key certificate used for the authentication process to a specific partner; acquiring information showing contents of the public key certificate corresponding to the identification information received in the step of receiving the public key certificate, from a location other than the communication device based on the identification information; and examining the communication device based on whether or not the public key certificate received in the step of receiving the public key certificate, by referring to the information acquired in the step of acquiring the information.

In the examination method, the step of examining the communication device may include the step of determining whether or not the public key certificate is proper, based on whether-or not contents of the public key certificate received in the receiving the public key certificate is identical to the information acquired in the step of acquiring the information.

Moreover, the above objects of the present invention are achieved by an examination method for examining a communication device for conducting an authentication process by using a public key encryption, said examination method including the steps of: receiving a private key of the communication device and identification information of the communication device from the communication device for conducting the authentication process by using the public key encryption; acquiring a public key corresponding to the identification information received in the step of receiving the private key, from a location other than the communication device; and examining the communication device based on whether or not the public key acquired in the step of acquiring the public key is identical to the private key received in the step of receiving the private key.

In the examination method, a correspondence between the identification of the communication device and the public key used by the communication device for the authentication process may be stored in an apparatus conducting the steps of receiving the private key, acquiring the public key, and examining the communication device.

Moreover, the step of examining the communication device may include a step of encrypting given data by using either one of the public key acquired by the acquisition part and the private key received by the receiving part, decrypting data encrypted by another one of the public key and the private key, and conducting the examination based on a decryption result.

The examination method may further include a step of sending the public key certificate as a new public key certificate of the communication device to the communication device, when the communication device passes an examination conducted in the step of examining the communication device.

Moreover, the public key certificate sent in the step of sending the new public key certificate may be a public key certificate including the identification of the communication device received in the step of receiving the private key.

Furthermore, the above objects of the present invention are achieved by a computer-executable program product for causing a computer to conduct an authentication process by using a public key encryption, said computer-executable program product including the codes for: receiving a public key certificate of the communication device and identification information of the communication device from the communication device, which conducts the authentication process by using the public key encryption and sends the public key certificate used for the authentication process to a specific partner; acquiring information showing contents of the public key certificate corresponding to the identification information received in the code of receiving the public key certificate, from a location other than the communication device based on the identification information; and examining the communication device based on whether or not the public key certificate received in the code of receiving the public key certificate, by referring to the information acquired in the code of acquiring the information.

In computer-executable program product, the code for examining the communication device may include the code for determining whether or not the public key certificate is proper, based on whether or not contents of the public key certificate received in the receiving the public key certificate are identical to the information acquired by the code for acquiring the information.

Moreover, the above objects of the present invention are achieved by a computer-executable program product for causing a computer to conduct an authentication process by using a public key encryption, said computer-executable program product including the codes for: receiving a private key of the communication device and identification information of a communication device from the communication device for conducting the authentication process by using the public key encryption; acquiring a public key corresponding to the identification information received by the code of receiving the private key, from a location other than the communication device; and examining the communication device based on whether or not the public key acquired by the code of acquiring the public key is identical to the private key-received by the code of receiving the private key.

The computer-executable program product may include the code for storing a correspondence between the identification information of the communication device and the public key used by the communication device for the authentication process.

Moreover, the code for examining the communication device may include the code for encrypting given data by using either one of the public key acquired by the acquisition part and the private key received by the receiving part, decrypting data encrypted by another one of the public key and the private key, and conducting the examination based on a decryption result.

The computer-executable program product further include the code for sending the public key certificate as a new public key certificate of the communication device to the communication device, when the communication device passes an examination conducted by the code for examining the communication device.

Moreover, the public key certificate set by the code for sending the public key certificate may be the public key certificate including the identification information of the communication apparatus received by the code for receiving the private key.

Moreover, the above objects of the present invention can be achieved by a computer-readable recording medium recorded with a program for causing a computer to conduct an authentication process by using a public key encryption, said computer-readable recording medium including the codes for: receiving a private key of the communication device and identification information of the communication device from the communication device for conducting the authentication process by using the public key encryption; acquiring a public key corresponding to the identification information received by the code of receiving the private key, from a location other than the communication device; and examining the communication device based on whether or not the public key acquired by the code of acquiring the public key is identical to the private key received by the code of receiving the private key.

BRIEF DESCRIPTION OF THE DRAWINGS

Other objects, features, and advantages of the present invention will become more apparent from the following detailed description when read in conjunction with the accompanying drawings, in which:

FIG. 2A and FIG. 2B are diagrams for explaining relationships among a root key, a root private key, and a public key certificate in an authentication process shown in FIG. 1.

FIG. 7 is a diagram for explaining a determination basis to determine whether or not a command can be executed by a request management part of the management subject device shown in FIG. 6, according to the embodiment of the present invention.

FIG. 9 is a diagram for explaining a format example of the public key certificate shown in FIG. 8, according to the embodiment of the present invention.

FIG. 10 is a diagram showing an example of the regular public key certificate for the management subject device in accordance with the format described in FIG. 9, according to the embodiment of the present invention.

FIG. 11 is a diagram showing an example of a rescue public key certificate for the management subject device, according to the embodiment of the present invention.

FIG. 13 is a diagram showing a configuration of a certificate, and a like, which are sent when the management apparatus sets the official authentication information to the management subject device, according to the embodiment of the present invention.

FIG. 15 is a diagram showing a part of a configuration example of a certificate database mounted in a certificate storage part of the management apparatus shown in FIG. 4, according to the embodiment of the present invention.

FIG. 16 a diagram showing another part of the configuration example of a certificate database mounted in a certificate storage part of the management apparatus shown in FIG. 4, according to the embodiment of the present invention.

BEST MODE FOR CARRYING OUT THE INVENTION

In the following, an embodiment of the present invention will be described with reference to the accompanying drawings.

Figure 4:
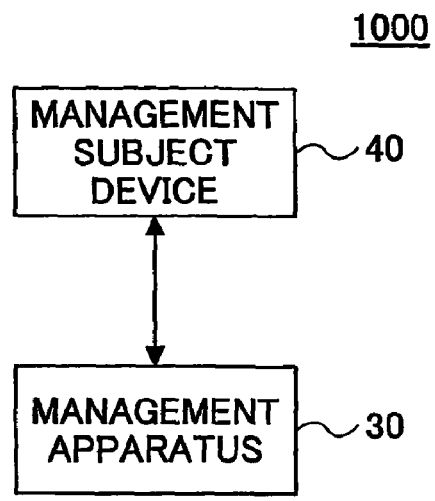
FIG. 4 is a block diagram showing a configuration example of a communication system according to an embodiment of the present invention.

In this embodiment, as shown in FIG. 4, a communication system includes a management apparatus 30 being an examination apparatus and a management subject device 40 being a communication device to be a communication partner of the management apparatus 30.

Then, in this communication system 1000, in a case in that the management apparatus 30 attempts to communicate with the management subject device 40, when the management apparatus 30 successfully authenticates the management subject device 40 as a valid communication partner by an authentication process in accordance with an SSL (Secure Socket Layer) protocol as an authentication method using a public key encryption and a digital certificate (public key certificate), a communication is established between the management apparatus 30 and the management subject device 40. Subsequently, with respect to an operation request (command) sent by the management apparatus 30, the management subject device 40 conducts a necessary process and returns a response. Thus, the management apparatus 30 and the management subject device function and realize a client/server system.

On the other hand, even in a case in that the management subject device 40 attempts to communicate with the management apparatus 30, similarly, when the management apparatus 30 is authenticated as the valid communication partner by the authentication process in accordance with the SSL, the management subject device 40 establishes a communication with the management apparatus 30. With respect to an operation request (command) sent from the management subject device 40, the management apparatus 30 conducts a necessary process and returns a response to the management subject device 40. Thus, the management apparatus 30 and the management subject device function and realize the client-server system.

In either case, a side requesting a communication functions as a client and a side being requested functions as a server.

In this communication system 1000, the management apparatus 30 includes a function for managing the management subject device 40 and also includes a function for re-issuing a public key certificate for conducting a regular authentication with respect to the management subject device 40 in a state in that the authentication by the SSL as described above and by using the public key certificate being regularly used cannot be conducted, and a function for determining whether or not the publication key certificate can be re-issued by examining the management subject device 40 of its re-issuance destination when the re-issuance is conducted.

Figure 23:
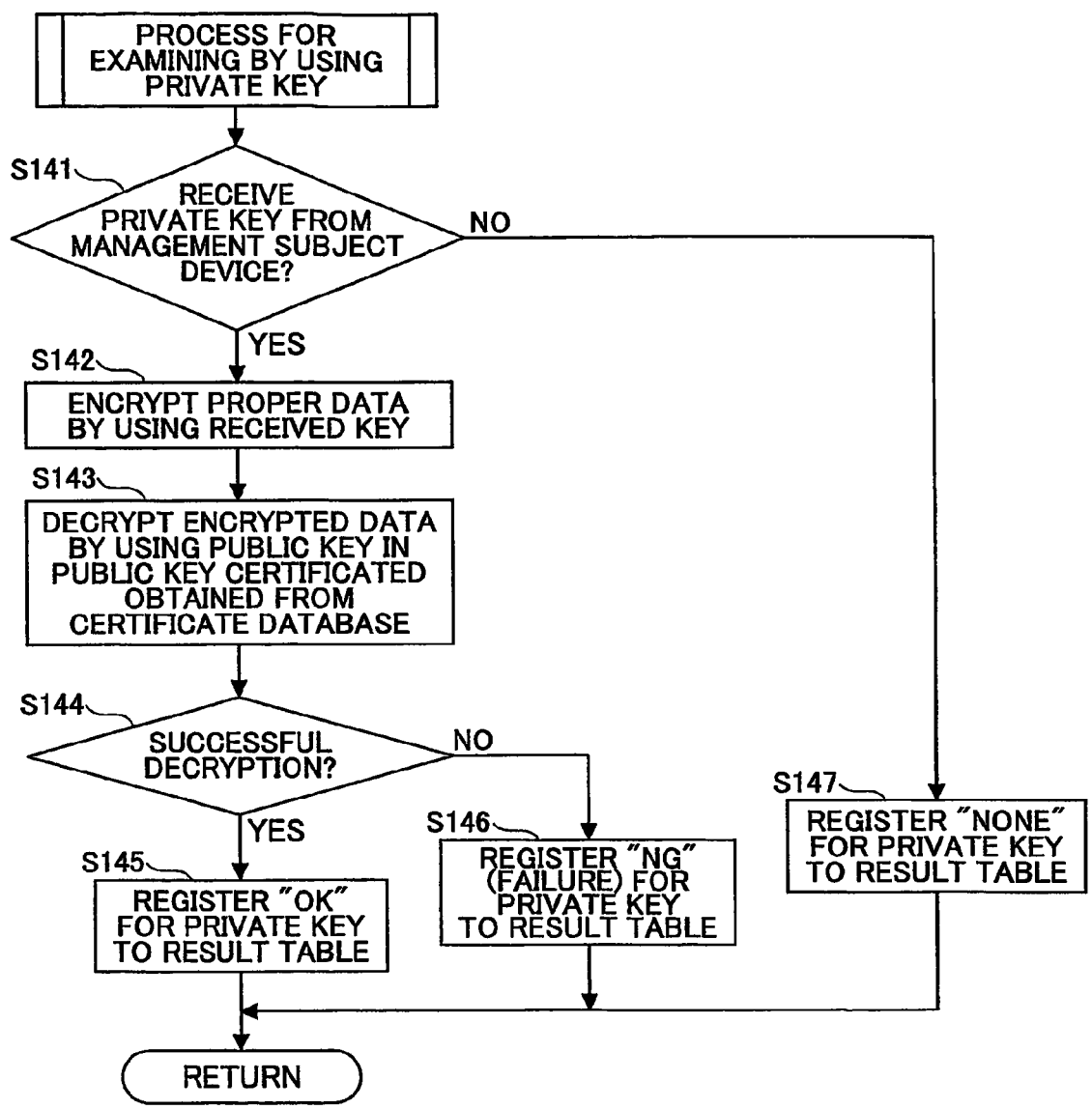
FIG. 23 is a flowchart showing an example of an examination process using the private key shown in step S98 in FIG. 19, according to the embodiment of the present invention.

In FIG. 4, only one management subject device 40 is shown. However, as shown in FIG. 23, a plurality of the management subject devices 40 can be arranged. Also, it is not necessary for the management subject device 40 to be one type. On the other hand, one management apparatus 30 is arranged for one communication system 1000.

In the communication system 1000, in a communication between the management apparatus 30 and the management subject device 40, a "request" is sent to request a process with respect to a method of an application program, which is implemented in both the management apparatus 30 and the management subject device 40 by an RPC (Remote Procedure Call). Then, a "response" showing a result of the process, which is requested, can be obtained.

In order to realize the RPC, a well-known protocol (communication procedure), technology, and specification such as a SOAP (Simple Object Access Protocol), an HTTP (Hyper Text Transfer Protocol), an FTP (File Transfer Protocol), a COM (Component Object Model), a CORBA (Common Object Request Broker Architecture), and a like can be used.

Next, each configuration and function of the management apparatus 30 and the management subject device 40 shown in FIG. 4 will be described in detail.

The management apparatus 30 and the management subject device 40 shown in FIG. 4 can be variously configured in response to a purpose of a remote management of a device, an electronic commerce, or a like. For example, in a case of the remote management, a network home electronic device, a vending machine, a medical instrument, a power device, an air conditioning system, a measuring apparatus for gas, water, electricity, and a like, an electronic apparatus such as an automobile, an aircraft, and a like, in addition to an image processing apparatus such as a printer, a facsimile, a copier, a scanner, a digital copier or a like may be arranged as the management subject device 40 to be managed. Also, a management apparatus for collecting information from the management subject device 40 and sending a command to have the management subject device 40 operated may be arranged as the management apparatus 30.

Figure 5:
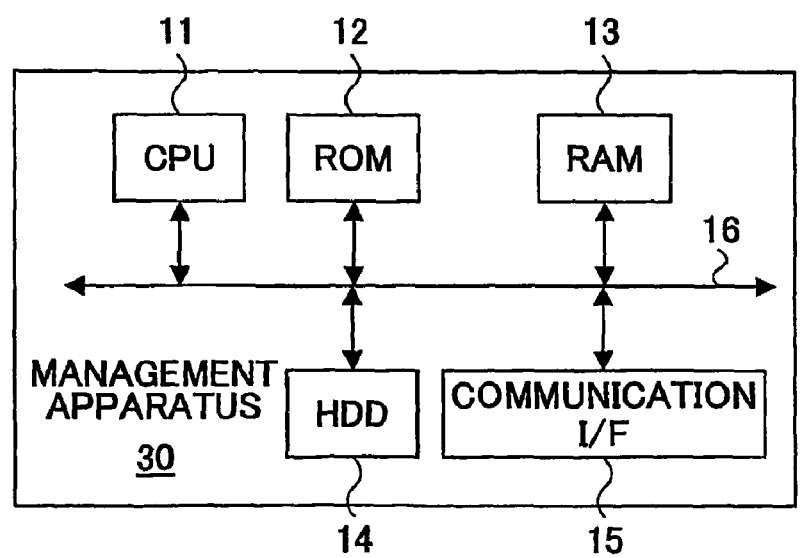
FIG. 5 is a block diagram showing a hardware configuration of a management apparatus shown in FIG. 4, according to the embodiment of the present invention.

FIG. 5 is a diagram showing a hardware configuration example of the management apparatus 30 according to the embodiment of the present invention. As shown in FIG. 5, for example, the management apparatus 30 includes a CPU (Central Processing Unit) 11, a ROM (read Only Memory) 12, a RAM (Random Access Memory) 13, an HDD (Hard Disk Drive) 14, and a communication interface (I/F) is, which are mutually connected via a system bus 16. The CPU 11 controls operations of the management apparatus 30 by executing various control programs stored in the ROM 12 or the HDD 14, and realizes various functions such as the authentication of the communication partner, the communication with the management subject device 40, a management of the management subject device 40, an issuance and a management of the public key certificate, and a like.

Of course, a well-known computer can be approximately used as the management apparatus 30, and other hardware can be additionally mounted if necessary.

The management subject device 40 also includes a CPU, a ROM, an RAM, and a communication I/F for communicating to external devices through a network, and a storage unit for storing information necessary for the authentication process, and realizes various functions according to the present invention by the CPU executing a predetermined control program stored in the ROM.

It should be noted that for the communication between the management apparatus 30 and the management subject device 40, various types of communication lines (communication paths) capable of architecting a network can be applied, regardless of being wired or wireless.

Figure 6:
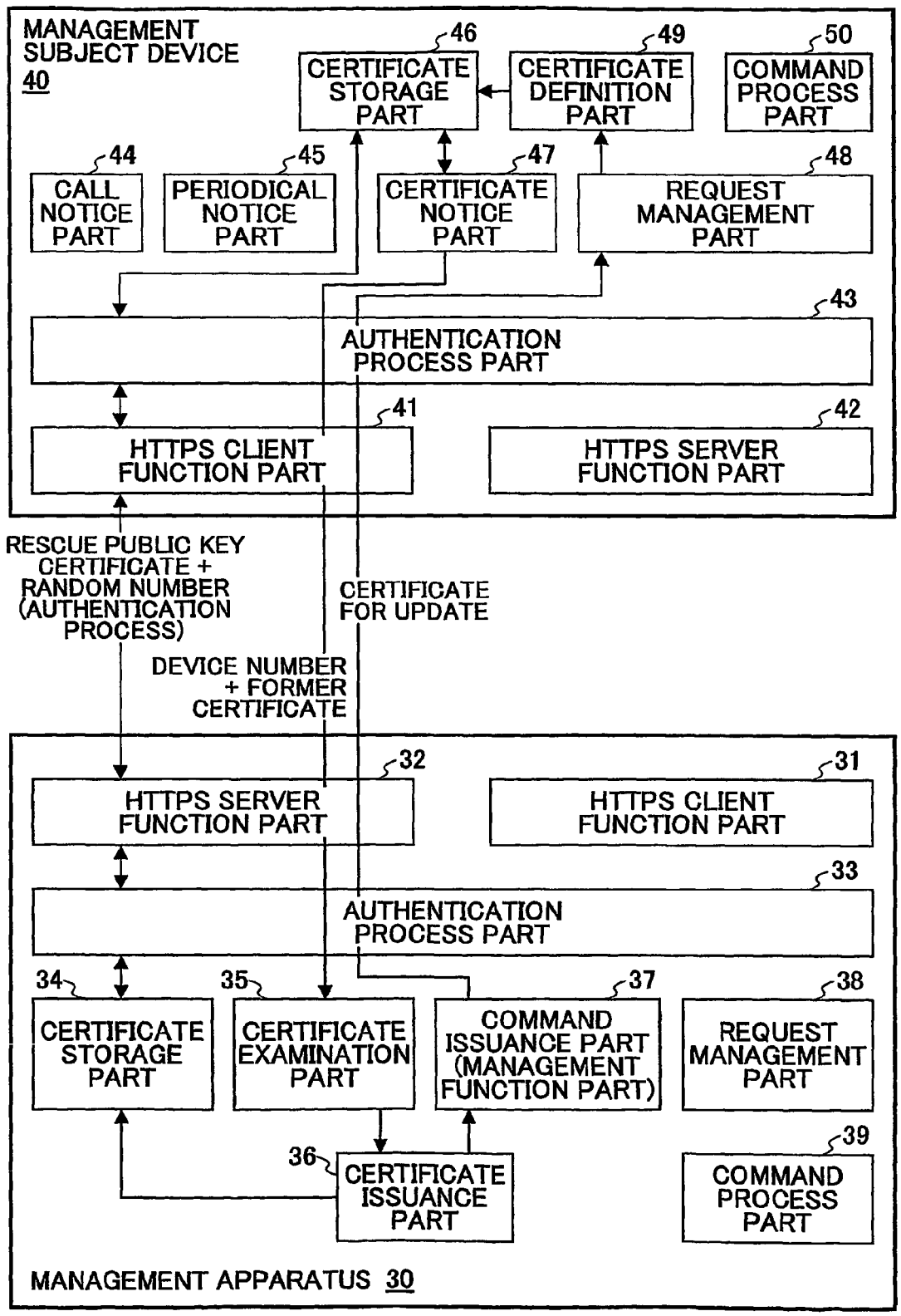
FIG. 6 is a block diagram showing a functional configuration of portions related to features of the present invention in the management apparatus and a management subject device shown in FIG. 4, according to the embodiment of the present invention.

FIG. 6 is a block diagram showing a functional configuration of portions related to features of the management apparatus 30 and the management subject device 40 according to the embodiment of the present invention. It should be noted that arrows in FIG. 6 show data flows in a case of re-issuing the regular public key certificate to the management subject device 40 in a state in that the management subject device 40 cannot be authenticated by using the regular public key certificate as described later.

First, the management apparatus 30 includes an HTTPS (Hypertext Transfer Protocol Security) client function part 31, an HTTPS server function part 32, an authentication process part 33, a certificate storage part 34, a certificate examination part 35, a certificate issuance part 36, a command issuance part 37, a request management part 38, and a command process part 39.

The HTTPS client function part 31 includes a function for requesting a communication with respect to a device having a function of an HTTPS server such as the management subject device 40 by using an HTTPS protocol including the authentication process and an encryption process in accordance with the SSL.

On the other hand, the HTTPS server function part 32 includes a function for accepting a communication request using the HTTPS protocol from a device having the HTTPS client such as the management subject device 40.

Accordingly, the HTTP client function part 31 and the HTTPS server function part 32 realize a function for having the communication partner execute an operation corresponding to a command by sending the command and data to the communication partner, and a function for receiving a request and data from the communication partner and having one or more parts in the management apparatus 30 execute an operation corresponding to the command, and for returning a response showing a result to the communication partner. In this case, a side requesting the communication may send a command and a side receiving the communication request may send a command. A similar manner may be conducted for the response.

The authentication process part 33 includes a function of an authentication means for conducting the authentication process using the public key certificate received from the communication partner, various certificates stored in the certificate storage part 34, a private key, and a like when the HTTPS client function part 31 or the HTTPS server function part 32 authenticates the communication partner. In addition, in order to request an authentication to the communication partner, the authentication process part 33 includes a function for sending the public key certificate stored in the certificate storage part 34 to the communication partner through the HTTPS client function part 31 or the HTTPS server function part 32.

The certificate storage part 34 includes a function for storing authentication information such as the public key certificate, the private key, a root key certificate, and a like, and provides the authentication information to the authentication process conducted by the authentication process part 33. Moreover, although details will be described later, authentication information which the certificate storage part 34 stores includes official authentication information used for the authentication process when a regular communication is conducted, and rescue authentication information being information for an emergency to recover when the authentication cannot be conducted by the official authentication information. Furthermore, the certificate storage part 34 includes a function for storing the public key certificate issued by the certificate issuance part 36 and information concerning its issuance destination and an issued date as a database.

The certificate examination part 35 includes a function for examining whether or not an update public key certificate and an update private key can be issued with respect to the management subject device 40 based on information such as a device number, a certificate, and a like, which are received from the management subject device 40, when the authentication process part 33 conducts the authentication process by using the rescue authentication information with the management subject device 40. The certificate issuance part 36 includes a function for issuing the update public key certificate and the update private key to the management subject device 40, when the certificate examination part 35 examines and determines that the update public key certificate and the update private key can be issued. It should be noted that regarding an issuance of the public key certificate, a digital signature may be additionally provided to the public key created and sent by the management subject device 40, and may be returned to the management subject device 40.

The command issuance part 37 includes a function for issuing various commands to the management subject device 40 and having the management subject device 40 execute an operation in accordance with an issued command. The operation executed by the management subject device 40 can be an operation for sending information concerning an operation content and a setting state of the management subject device 40, an operation for storing the update public key certificate and information sent from the management apparatus 30, an operation for conducting a setting change based on the information, or a like. The command issuance part 37 includes a function for causing the management subject device 40 to execute various operation in accordance with information obtained from the management subject device 40, so as to manage the management subject device 40.

The request management part 38 includes a function for determining whether or not an operation based on a command can be executable when the command received from the management apparatus 30. Moreover, the request management part 38 includes a function for informing the command to a function part for executing the operation based on the command when the operation is allowed to be executed. It should be noted that the function part for executing an operation based on the command may be configured as a plurality of individual modules in reality. However, in FIG. 6, the plurality of individual modules are collectively shown as the command process part 39. The operation executed by the command process 39, for example, can be an operation for corresponding to a notice of an abnormal occurrence from the management subject device 40, an operation for sending data stored by the management apparatus 30 in response to a request from the management subject device 40.

Each function of the above-described parts can be realized by the CPU of the management apparatus 30 controlling each operation of the above-described parts of the management apparatus 30 by executing the predetermined control program.

Next, the management subject device 40 includes an HTTPS client function part 41, an HTTPS server function part 42, an authentication process part 43, a call notice part 44, a periodical notice part 45, a certificate storage part 46, a certificate notice part 47, a request management part 48, a certificate definition part 49, and a command process part 50.

The HTTPS client function part 41 includes a function for requesting a connection to an apparatus including the HTTPS server function such as the management apparatus 30 using the HTTPS protocol, and for sending a command and receiving a response, similar to the HTTPS client function part 31 of the management apparatus 30.

The HTTPS server function part 42 also includes a function for receiving the communication request from the apparatus having the HTTPS client function, and sending a command and receiving a response, similar to the HTTPS server function part 32 of the management apparatus 30.

The authentication process part 43 also includes a function similar to the authentication process part 33 of the management apparatus 30, but stores a certificate and a like used for the authentication process in the certificate storage part 46.

The call notice part 44 includes a function for conducting a call to send a notice to the management apparatus 30 when an abnormal state is detected or a user made an instruction.

The periodical notice part 45 includes a function for sending a periodical notice from the management subject device 40 to the management apparatus 30. A content of the notice may be, for example, a count value of an image formation counter if the management subject device 30 is an image forming apparatus, a meter value if the management subject device 30 is a meter system.

The certificate storage part 46 includes a function of a certificate storing means for storing the authentication information such as various certificates, private keys, and a like, and providing the authentication information to the authentication process conducted by the authentication process part 43, similar to the certificate storage part 34 of the management apparatus 30. However, the certificates and the like stored by the certificate storage part 46 are different form the certificates and the like stored in the certificate storage part 34.

In a case in that the authentication using the official authentication information cannot be conducted and the authentication using the rescue authentication information is conducted by the management apparatus 30, or a like, when it is required for the management apparatus 30 to examine by using the official authentication information, the certificate notice part 47 sends the official authentication information being currently used, with the device number of the management subject device 40 to the management apparatus 30, and includes a function for the management subject device 40 to be examined by the management subject device 40.

The request management part 48 includes a function for determining whether or not an operation based on a command can be executable for the command received from the management apparatus 30. Also, the request management part 48 further includes a function for informing the command to a function part such as the certificate definition part 49 and the command process part 50 for executing respective operation based on the command.

In FIG. 7, a determination basis for determining whether or not the command can be executed is shown. The determination basis is based on a type of the command, and the authentication information used for the authentication process by the authentication process part 43. As shown in FIG. 7, the request management part 48 permits all operations when the authentication is successfully conducted by using the official authentication information. On the other hand, the request management part 48 permits only a predetermined operation for defining the certificate (including the private key) when the authentication is conducted by the rescue authentication information. It should be noted that in this case, only the certificate forming the official authentication information is defined (and updated), but the certificate forming the rescue authentication information is not defined. Accordingly, the rescue authentication information is authentication information used only when new official authentication information is stored in the management subject device 40.

The certificate definition part 49 includes a function for setting an update public key certificate to the certificate storage part 46 to use for the authentication process in response to a command received from the management apparatus 30, and updating the public key certificate with the update public key certificate.

The command process part 50 includes a function for executing an operation in response to the command received from the management apparatus 30. The operation can be, for example, to send data stored in the management subject device 40, to control an operation of an engine part (not shown) if necessary, or a like. The function part for executing the operation based on the command can be actually configured by a plurality of individual modules, similar to a case of the command process part 39 of the management apparatus 30. The certificate definition part 49 described above can be considered as one of such modules.

Each function of the above-described parts can be realized by the CPU of the management subject device 40 controlling each operation of the above-described parts of the management subject device 40 by executing the predetermined control program.

Figure 8B:
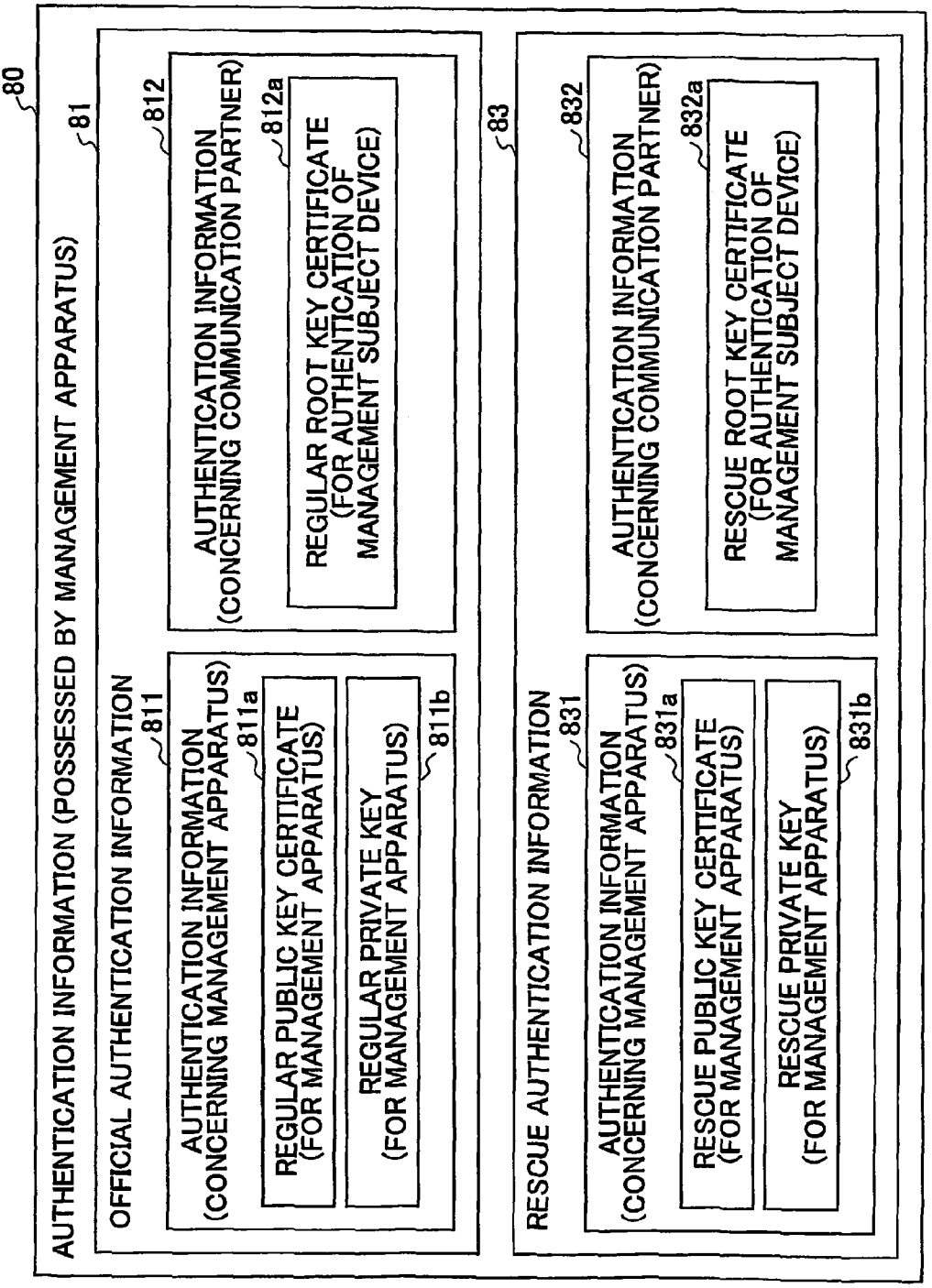
FIG. 8 is a diagram for explaining a certificate and a key used for an authentication process by the management apparatus and the management subject device shown in FIG. 4 and FIG. 6, according to the embodiment of the present invention.

Next, FIG. 8A and FIG. 8B are diagrams showing types of the certificates and keys used for the authentication processes by the management apparatus 30 and the management subject device 40 according to the embodiment of the present invention. FIG. 8A shows types of certificates and keys stored in the certificate storage part 46 of the management subject device 40, and FIG. 8B shows types of certificates and keys stored in the certificate storage part 34 of the management apparatus 30. In FIG. 8A and FIG. 8B, the certificates and keys used for the authentication processes only for the management apparatus 30 and the management subject device 40 are shown.

In FIG. 8A, the management subject device 40 mainly stores official authentication information 71 and rescue authentication information 73 in authentication information 70. Moreover, the official authentication information 71 includes authentication information 711 concerning the management subject device 40 itself, and authentication information 712 concerning a communication partner. Furthermore, the authentication information 711 includes a regular public key certificate 711*a* (for management subject device 40) and a regular private key 711*b* for the management subject device 40 itself. Also, the authentication information 712 includes a regular root key certificate 712*a* for authenticating the management apparatus 30. Similarly, the rescue authentication information 73 includes authentication information 731 concerning the management subject device 40 itself, and authentication information 732 concerning a communication partner. Furthermore, the authentication information 731 includes a rescue public key certificate 731*a* and a rescue private key 731*b* for the management subject device 40 itself. Also, the authentication information 732 includes a rescue root key certificate 732*a* for the management apparatus 30.

In FIG. 8B, the management apparatus 30 mainly stores official authentication information 81 and rescue authentication information 83 in authentication information 80. Moreover, the official authentication information 81 includes authentication information 811 concerning the management apparatus 30 itself, and authentication information 812 concerning a communication partner. Furthermore, the authentication information 811 includes a regular public key certificate 811*a* (for management apparatus 30) and a regular private key 811*b* for the management apparatus 30 itself. Also, the authentication information 812 includes a regular root key certificate 812*a* for authenticating the management subject device 40. Similarly, the rescue authentication information 83 includes authentication information 831 concerning the management apparatus 30 itself, and authentication information 832 concerning a communication partner. Furthermore, the authentication information 831 includes a rescue public key certificate 831*a* and a rescue private key 831*b* for the management apparatus 30 itself. Also, the authentication information 832 includes a rescue root key certificate 832*a* for the management subject device 40.

As described above, the official authentication information 71 and 81 and the rescue authentication information 73 and 83 is formed by the regular public key certificates 711*a* and 811*a*, the rescue public key certificates 731*a* and 831*a*, the regular private keys 711*b* and 811*b*, the regular root key certificates 712*a* and 812*a*, and the rescue root key certificates 732*a* and 832*a*, respectively. Moreover, the official authentication information 71 and 81 are authentication information used for the authentication process at a regular communication. The rescue authentication information 73 and 83 are authentication information used for an emergency in a recovery process in a case in that the authentication cannot be conducted by using the official authentication information.

Figure 1:
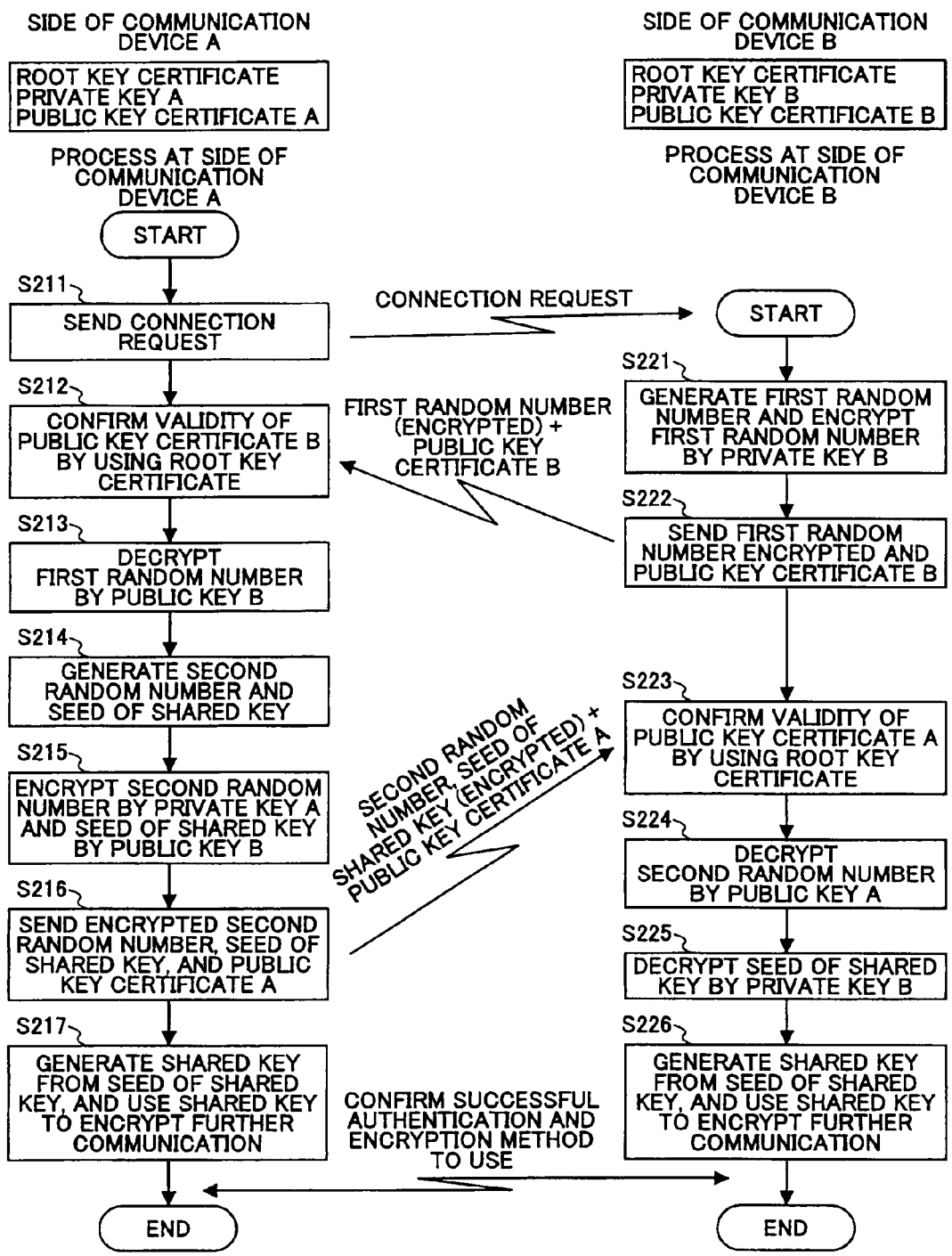
FIG. 1 is a diagram showing a flowchart of a process executed by each device with information used for the process when two communication devices conduct a mutual authentication with accordance with an SSL.
Figure 3:
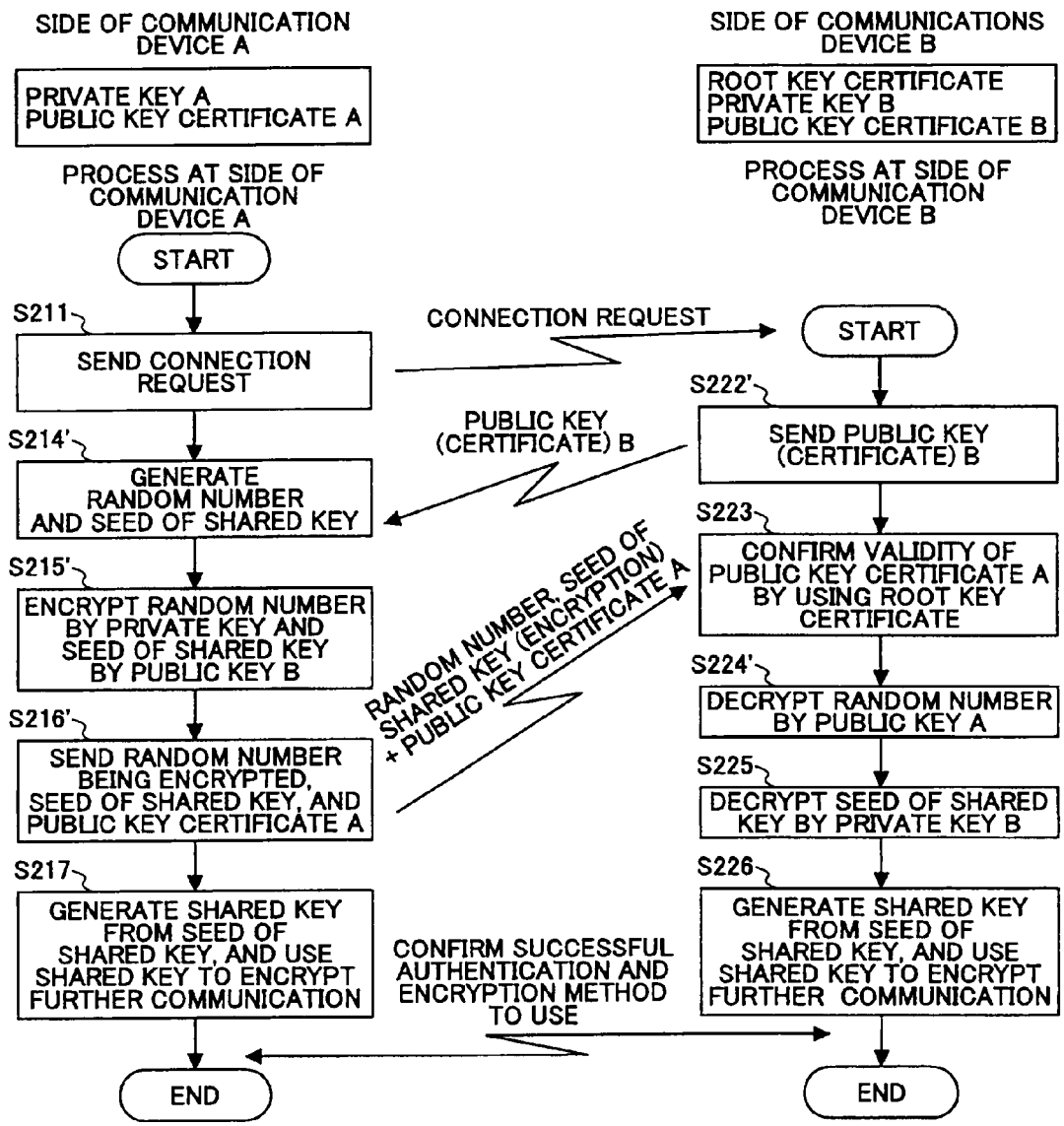
FIG. 3 is a diagram showing a process executed by each device when two communication devices conduct a one-way authentication in accordance with the SSL, corresponding to the mutual authentication in FIG. 1.

Each of the management apparatus 30 and the management subject device 40 conducts the mutual authentication by a procedure shown in FIG. 1 or the one-way authentication by a procedure shown in FIG. 3 in accordance with the SSL with its communication partner using its authentication information during a normal communication.

In this case, for example, a format of the public key certificate shown in FIG. 9 can be used. In addition to the public key itself, in the format, information such as an issuer of a certificate, a validated date and a serial number of the certificate, a subject (a device or a user as an issuance destination of the certificate) to be certified, and a like are described. In detail, for example, the public key certificate can be created in accordance with a format called an X.509 format.

FIG. 10 is a diagram showing a public key certificate example for the management subject device 40, which is created in accordance with the X.509 format.

In the public key certificate example, a reference sign A shows a serial number of the public key certificate. A reference sign B shows identification information of the management apparatus 30 (in which a digital signature is additionally provided to the public key) which issues the public key certificate, and a reference sign D shows identification information of the management subject device 40 being an issuance destination of the certificate. Each of the above-described information includes information such as a location, a name, a device number or a code, and a like. However, it is not mandatory to describe the identification information possible to identify each device such as the device number for a device as the issuance destination. In addition, a reference sign C shows the valid term by indicating a start date and an end date. A reference sign E shows a body of the regular public key for the management subject device.

Moreover, the regular private key for the management subject device 30 is a private key corresponding to the regular public key for the management subject device 40, and the regular root key certificate for the management subject device 40 is a digital certificate to which the digital signature capable of confirming the validity by itself by using the root private key corresponding to itself is additionally provided to the regular root key for authenticating the management subject device 40.

In a case of providing a plurality of the management subject devices 40, the digital signature is additionally provided to the regular public key for the management subject device 40 for each device by using the same root private key, and the root key certificate necessary to confirm the validity thereof is shared. However, the public key included in the regular public key certificate for the management subject device 40 and the private key corresponding to the public key are different for each device.

A regular public key certificate for the management apparatus 30, a regular private key for the management apparatus 30, and the regular root key certificate for authenticating the management apparatus 30 have a similar relationship.

For example, in a case in that the management apparatus 30 and the management subject device 40 conduct the mutual authentication, in response to a communication request from the management subject device 40, the management apparatus 30 sends a first random number encrypted by using the regular private key for the management apparatus 30 to the management subject device 40 with the regular public key certificate for the management apparatus 30. First, the management subject device 40 confirms the validity (showing no compromise and no falsification) of the regular public key certificate for the management apparatus 30 by using the regular root key certificate for authenticating the management apparatus 30. When the validity is confirmed, the management subject device 40 decrypts the first random number by using the public key included in the public key certificate. In a case in that this decryption is successful, the management subject device 40 can surely recognize that the management apparatus 30 as the communication partner is the issuance destination of the regular public key certificate for the management apparatus 30, and can specify the management apparatus 30 from the identification information included in the public key certificate. Accordingly, it is possible for the management subject device 40 to check whether or not a specified apparatus is suitable for the communication partner and to determine whether or not the authentication is successful or failed base on a check result.

Moreover, the management apparatus 30 receives the regular public key certificate for the management subject device 40 and a random number encrypted by using the regular private key for the management subject device 40, which are sent when the authentication is successful at the management subject device 40, and then conducts a similar authentication by using the regular root key certificate for the management subject device 30 stored in the management apparatus 30.

This procedure is conducted when the management subject device 40 requests a communication to the HTTPS server function part 32 of the management apparatus 30 by the HTTPS client function part 41. In a case in that the management apparatus 30 requests a communication to the HTTPS server function part 42 of the management subject device 40 by the HTTPS client function part 31, the same certificate and key are used, but the processes of the management apparatus 30 and the management subject device 40 are opposite to each other.

As seen from the above explanation, in a case in which each device sends the regular public key certificate to the communication partner, when the certificate is compromised and a validated data of the certificate is expired, the authentication cannot be conducted. Accordingly, in such a state, an update may fail if a power is cut during the update process for the authentication information, or the update may not be conducted before the validated date if the device remains in a power off state and passes over the validated date of the certificate.

If each device is allowed to conduct only the authentication using the regular public key certificate, in a state in that the regular public key certificate is compromised or a valid term has passed, there is no method to securely send a new regular public key certificate, a new regular public key, and a new regular root key certificate to a subject device through a network. However, each device forming the communication system 1000 stores the rescue authentication information in order to handle this situation. That is, it is possible to authenticate the communication partner by using two types of digital certificates. By using the rescue authentication information, it is possible to securely send the new regular public key certificate and the like from the management apparatus 30 to the management subject device 40 through a network.

This rescue authentication information is formed similarly to the official authentication information. For example, the rescue public key certificate for the management subject device 40 is a digital certificate in which a digital signature capable of confirming validity is additionally provided by using the rescue root key for authenticating the management subject device 40 to the rescue public key created by a rescue CA (not shown). Also, the rescue private key for the management subject device 40 is a private key corresponding to its rescue public key, and the rescue root key certificate for the management subject device 40 is a digital certificate in which the digital signature capable of confirming the validity by using the rescue root key for the management subject device 40 is provided to the rescue root key for the management subject device 40 itself.

As such rescue authentication information, for example, the rescue public key certificate may use the digital certificate which is not provided with identification information of a device.

Figure 27:
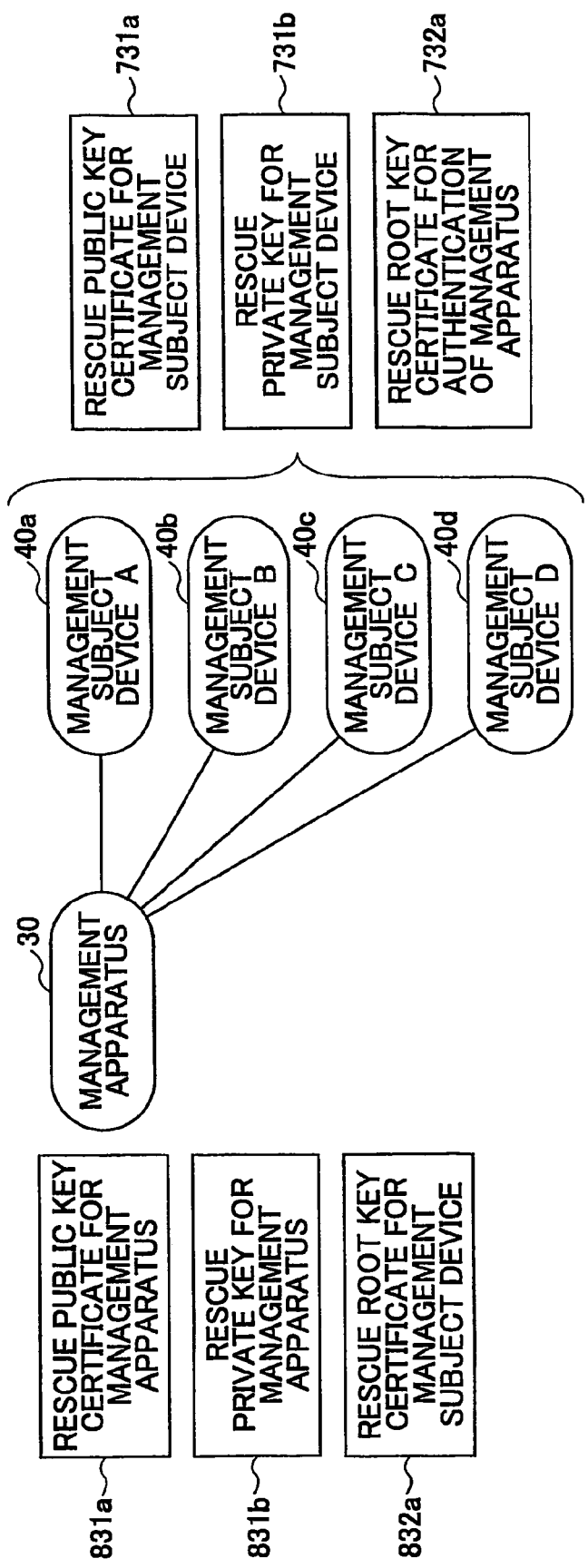
FIG. 27 is a diagram showing an example of a configuration in that a plurality of management subject devices are arranged in the communication system shown in FIG. 4, according to the embodiment of the present invention.

In this case, for devices being the same level (in the example shown in FIG. 4, there are levels for the management apparatus 30 and the management subject device 40) the same rescue public key certificate is stored for all devices. Since it is not necessary to distinguish among the devices being the same level, not only the rescue public key certificate but also the rescue public key and the rescue private key corresponding to the rescue public key, which are included in the rescue public key certificate, can be shared for all devices. In addition, since all rescue public key certificates for communication partners are the same, the same rescue public key certificate is shared with all communication partners for a device being a certain level. That is, as shown in FIG. 27, even in a case of providing a plurality of the management subject devices, the same rescue authentication information is stored for all management subject devices.

This manner is applied to the rescue authentication information of the management apparatus 30.

Moreover, such this rescue public key certificate can be also created similar to the regular public key certificate. For example, the rescue public key certificate can be formed as shown in FIG. 11. In this case, for example, as shown by a reference number G, the device number (CN) of the issuance destination device may be described as "0 (zero)", so as to indicate a shared certificate. As information of an issuance originator CA, a reference number F shows identification information of a rescue CA.

Since the rescue authentication information has a feature in that the rescue authentication information is shared with all devices being the same level, the rescue authentication information defined by the device type is recorded when a device is manufactured. That is, since the rescue authentication information is not information in which the identification information of the device is provided, it is not necessary to prepare and record an individual certificate for each device to which a test step is completed and an identification number is provided. Accordingly, the rescue authentication information can be recorded to a plurality of devices by a simple operation. For example, the rescue authentication information is included in a master of the control program, and the rescue authentication information is recorded when the control program is copied to each device.

After that, if the rescue authentication information is suppressed not to be updated, even in a case in that the official authentication information cannot be updated and compromised as described above, and the authentication cannot be conducted by the regular public key certificate, it is possible to maintain a state capable of conducting the authentication using the rescue public key certificate included in the rescue authentication information.

Moreover, in a case in that the rescue public key certificate and the rescue root key certificate are not updated, their valid terms are preferably set to be longer so that their validated dates will not come on a date practically when the issuance destination device is in use. For example, in the example shown in FIG. 11, the valid term is set as fifty years.

In a case of using the rescue public key certificate to which the identification information of the device is not provided, if the authentication using the rescue public key certificate is conducted, a device as the communication partner cannot be specified in detail. However, it is possible to obtain a certain amount of information.

That is, for example, a certain vendor records the rescue authentication information for the management subject device 40 (the rescue public key certificate for the management subject device, the rescue private key for the management subject device, and the rescue root key certificate for authenticating the management apparatus 30) to all devices being the management subject device 40 of products of vendor, and records the rescue authentication information for the management apparatus 30 (the rescue public key certificate for the management apparatus 30, the rescue private key for management apparatus 30, and the rescue root key certificate for authenticating the management subject device 40) to all apparatuses being the management apparatus 30 as a communication partner of the management subject device 40. Accordingly, the management subject device 40 can recognize the communication partner sending the public key certificate capable of confirming the validity by the rescue root key certificate for authenticating the management apparatus 30, which is recorded in the management subject device 40 itself, as the management apparatus 30 produced by the same vendor. On the other hand, the management apparatus 30 can recognize the communication partner sending the public key certificate capable of confirming the validity by the rescue root key certificate for authenticating the management subject device 40, which is recorded in the management apparatus 30 itself, as the management subject device 40 produced by the same vendor.

When the authentication process is successful, a secured communication path can be provided by using a shared key encryption sharing the public key with the communication partner as described above. After that, it is possible to specify the communication partner by exchanging the device number and a like.

Accordingly, without using the identification information described in the regular public key certificate, it is possible to specify a communication partner.

In the authentication information shown in FIG. 8, the same regular root key certificate may be used without concerning an authentication subject (the regular root key certification for authenticating the management apparatus can be the same as the regular root key certificate for authenticating the management subject device). Since the identification information of the communication device or the management apparatus is provided in the regular certificate, if the validity the regular certificate can be confirmed by using the root key certificate, it is possible to specify a device type and a level of the communication device or the management apparatus by referring to the identification information.

However, in a case of applying the rescue authentication information in which the identification information of the communication device or the management apparatus is not provided to the pubic key certificate, since the identification information of the communication device or the management apparatus is not provided to the public key certificate, the device type of the communication device or the management apparatus can be distinguished based on whether or not the validity can be confirmed by a specific root key certificate.

Accordingly, in this case, the rescue root key certificate is required to be different from each level of the authentication subject.

However, in a case of conducting the authentication process in accordance with the SSL protocol, since the server cannot know a state of a client when the server receives a communication request from the client, eventually, the same public key certificate is always returned when a specific URL (Uniform Resource Locator) is accessed by the client. Thus, basically, it is impossible to realize a configuration in that one server has a plurality of the public key certificates, and selectively sends a proper public key certificate suitable for a type of the public key certificate used for the authentication by the communication partner. However, in each of the management subject device 40 and the management apparatus 30 shown in FIG. 4, by applying a special configuration, it is possible to selectively use the regular public key certificate and the rescue public key certificate.

Next, a selective use process will be described with reference to FIG. 12.

As described above, the server basically cannot return any other certificates except for a specific public key certificate to the client which sends a communication request to the server. However, in a case of receiving a different URL of the communication request, it is possible to return a different public key certificate for each URL.

Figure 12:
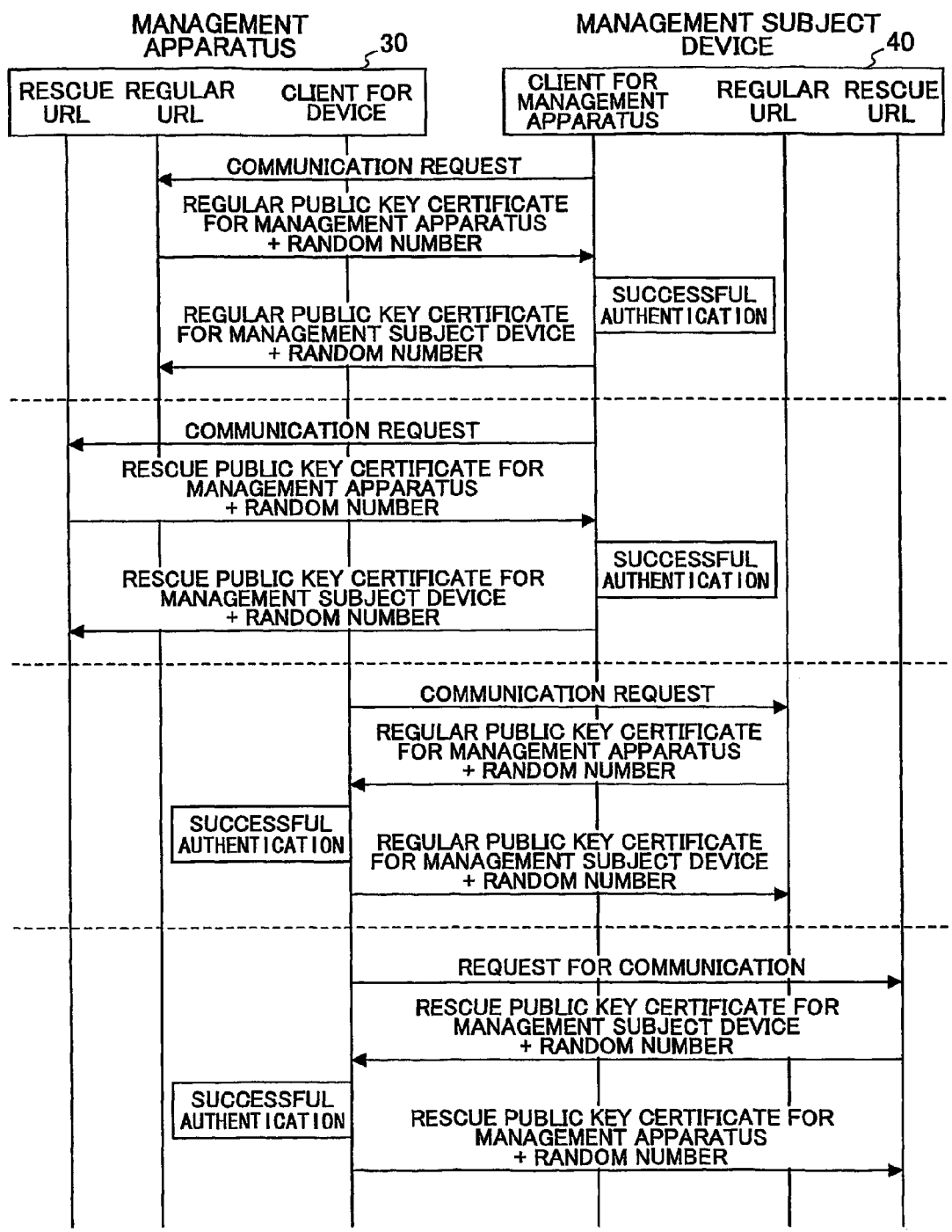
FIG. 12 is a diagram for explaining regular authentication information and rescue authentication information in the communication system shown in FIG. 4, according to the embodiment of the present invention.

Accordingly, in a case as shown in FIG. 12, each of the management apparatus 30 and the management subject device 40 provides a regular URL for conducting an authentication by using the regular public key certificate, and a rescue URL for conducting the authentication by using the rescue public key certificate. A side to send the communication request (side functioning as a client) sends a communication request by selectively indicating either one of the regular URL and the rescue URL depending on a type of a requested authentication.

In a case of applying the SSL to a communication protocol between the management apparatus 30 and the management subject device 40, since a port 443 is generally used for communication, it is required to change an IP address for the regular URL and the rescue URL. Accordingly, the management apparatus 30 and the management subject device 40 can be configured by a unit being formed by a plurality of portions (included in individual chasses or in the same chassis). And a different IP address can be set for each of the portions).

In this configuration, a side receiving the communication request (a side functioning as the server) distinguishes the communication request by an accepted URL. When the regular URL is accepted, the regular public key certificate is returned. On the other hand, when the rescue URL is accepted, the rescue public key certificate is returned.

It should be noted that since the side as a client sending the communication request can recognize to which URL the communication request is sent, a proper public key certificate suitable for the URL can be selected and sent when the mutual authentication is conducted.

Then, in a case in that the management subject device 40 attempts to communicate with the management apparatus 30, first, the management subject device 40 attempts to conduct the authentication using the regular public key certificate. When the authentication fails because the regular public key certificate is compromised or the valid term passes, the management subject device 40 attempts to conduct another authentication using the rescue public key certificate. Also, if the management apparatus 30 is a proper communication partner, this authentication using the rescue public key certificate is generally successful. The management apparatus 30 includes a function for updating the official authentication information of the management subject device 40 when the authentication using the rescue public key certificate.

That is, when the management subject device 40 sends the communication request to the management apparatus 30, first, the management subject device 40 sends the communication request to the regular URL, and conducts the authentication using the regular public key certificate. When this authentication fails, next, the management subject device 40 sends the communication request to the rescue URL, and conducts the authentication using the rescue public key certificate.

Subsequently, the management apparatus 30 authenticates the management subject device 40 by using the rescue public key certificate. When the management subject device 40 is authenticated as a proper communication partner, the management apparatus 30 issues the update official authentication information, and requests the management subject device 40 to store the update official authentication information by sending the update official authentication information.

Even if the authentication is conducted by using the rescue public key certificate, since the shared key can be shared similar to the regular public key certificate, it is possible to encrypt the certificate and the like by using the shared key and securely send the certificate and the like. It should be noted that the certificate and the like are ones as shown in FIG. 13, and are to form the official authentication information 71 to store in the management subject device 40. The update regular public key certificate for the management subject device 40 is within the valid term. In this case, as shown in FIG. 13, the regular public key certificate for management subject device 40, the regular private key for the management subject device 40, and the regular root key for authenticating the management apparatus may form as one set, and may be sent as one certificate set.

Moreover, when the management subject device 40 receives the above request, the management subject device 40 stores the received certificate and the like in the certificate storage part 46 by the certificate setting part 49, and updates the official authentication information.

When the update is normally conducted, the management subject device 40 stores the regular public key certificate again, which is not compromised and is within the valid term. Accordingly, the management subject device 40 is in a state possible to conduct the authentication using the regular public key certificate. After that, the management subject device 40 conducts the authentication using the regular public key certificate to communicate with the management apparatus.

However, in a case of updating the official authentication information, as the rescue pubic key certificate, if the rescue public key certificate, which does not include the device number of the issuance subject device, is used, the management apparatus 30 has to trust the device number of the management subject device 40 which sent the communication request, after a communication path is established. This device number is stored, for example, in a non-volatile memory by the management subject device 40. However, since a means for preventing from the falsification is not provided to information of the device number itself, it is relatively easy to falsify the information and pretend to be another device.

Thus, in this communication system 1000, when the management subject device 40 is authenticated by using the rescue authentication information, the management apparatus 30 conducts an examination for confirming credibility of the device number sent from the management subject device 40.

The examination causes the management subject device 40 to send the official authentication information stored in the management subject device 40 when the management subject device 40 is authenticated, and determines whether or not the official authentication information corresponds to the device number sent from the management subject device 40.

Next, a process concerning the update of the certificate by using the two types of authentication information: the official authentication information, and the rescue authentication information, will be described.

Figure 14:
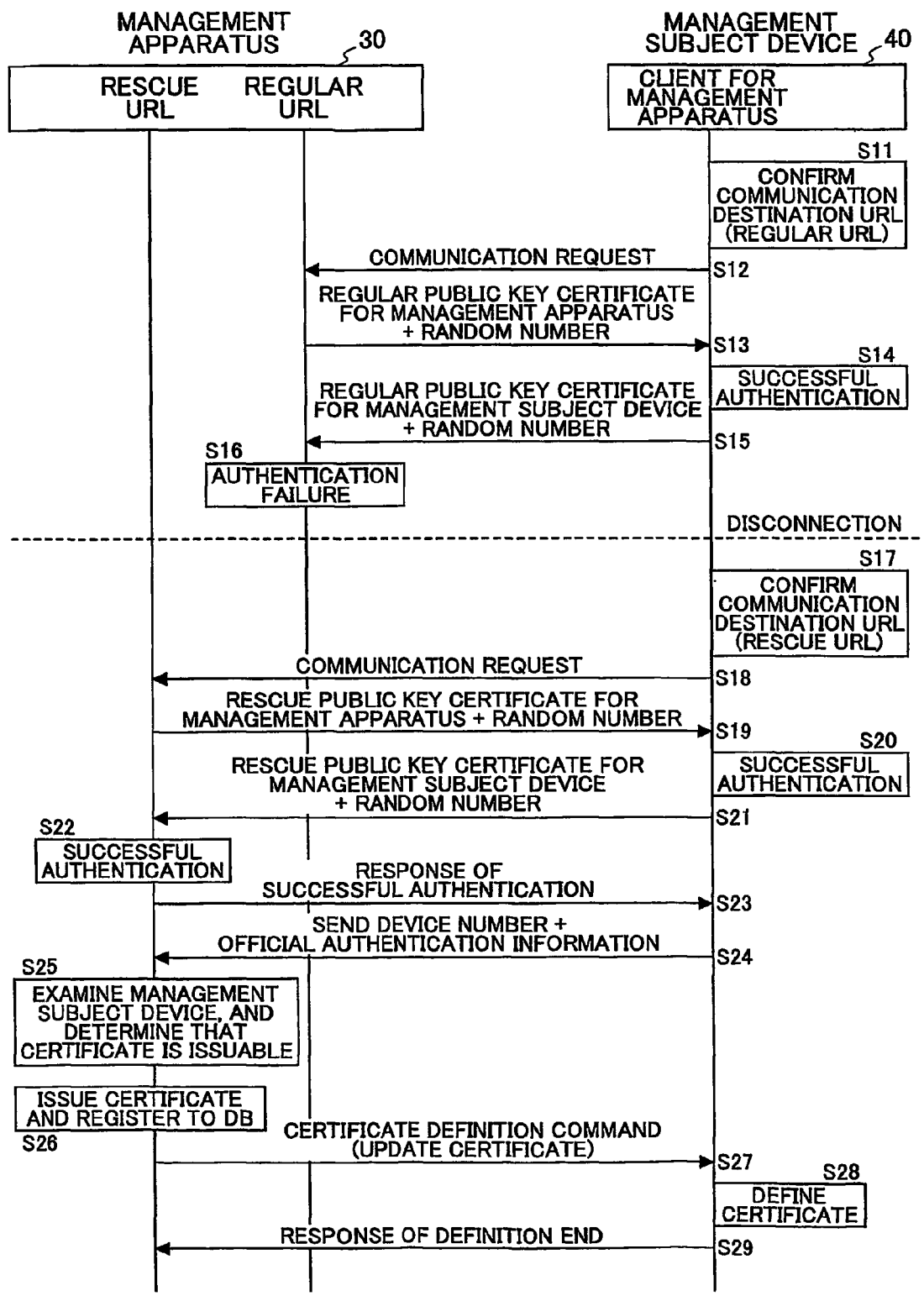
FIG. 14 is a sequence diagram showing a flow of a process conducted by each device in a case of updating the official authentication information which cannot be used for the authentication at the management subject device in the communication system shown in FIG. 4, according to the embodiment of the present invention.

First, referring to a sequence diagram shown in FIG. 14, the entire update process will be described. FIG. 14 shows a process example in a state impossible to be authenticated because the regular public key certificate for the management subject device 40, which is stored in the management subject device 40, is comprised or passes the valid term.

In this example, first, when the management subject device 40 communicates with the management apparatus 30, the management subject device 40 confirms a URL to send with the communication request (SII), controls the HTTPS client function to operate as the client for the management apparatus, and sends the communication request to the regular URL confirmed in the step SII (S12). In this case, when the management apparatus 30 receives the communication request by the HTTP server function part 32, and informs the communication request to the authentication process part 33. The authentication process part 33 generates and encrypts a first random number by using the regular private key for the management apparatus 30, which is stored in the certificate storage part 34, in accordance with the SSL protocol, and sends the regular public key certificate for the management apparatus 30, which is also stored in the certificate storage part 34, with the first random number to the management subject device 40 (S13).

The management subject device 40 sends the regular public key certificate and the first random number to the authentication process part 43 to conduct the authentication process. In this case, the validity of the regular public key certificate for the management apparatus 30, which is received from the management apparatus 30, can be confirmed by using the regular root key certificate stored in the certificate storage part 46. Thus, it is determined that the authentication is successful (S14), the management subject device 40 generates and encrypts a second random key by using the regular private key for the management subject device 40, which is stored in the certificate storage part 46, and sends the regular public key certificate for the management subject device 40, which is also stored in the certificate storage part 46, with the second random number to the management apparatus 30 (S15). In the step S15, a seed of the shared key, which is encrypted by using the regular public key for the management apparatus 30 received in step S13), is also sent to the management apparatus 30.

The management apparatus 30 receives and sends the regular public key certificate for the management subject device 40, the second random key, and the seed of the shared key to the authentication process part 33. In this case, since the regular public key certificate for the management subject device 40 cannot be authenticated, it is determined that the authentication fails (S16). Accordingly, the management apparatus 30 disconnects the communication with the management subject device 40.

When the communication is disconnected, the management subject device 40 sends the communication request to the rescue URL at this stage, since the management subject device 40 is not authenticated by using the regular public key certificate (S17 and S18). Subsequently, the management subject device 40 attempts to conduct the mutual authentication with the management apparatus 30 by using the rescue public key certificate together (S19, S20, and S21). Only a type of the authentication is different but processes in the steps S19, S20, and S21 are similar to processes in the steps S13 through S15, and explanation thereof will be omitted.

At this stage, the authentication is successful (S22), and the management apparatus 30 sends a response showing that the authentication is successful, to the management subject device 40 (S23). When the management subject device 40 receives the response from the management apparatus 30, the management subject device 40 sends the device number, the official authentication information stored in the certificate storage part 46, and the like to the management apparatus 30 (S24)-. Then, the certificate examination part 35 of the management apparatus 30 examines the management subject device 40 based on the device number, the official authentication information, and the like. When the certificate examination part 35 determines that an update certificate can be issued (S25), the certificate issuance part 36 issues the update certificate, and also registers the public key certificate being issued and the identification information of an issuance destination device to the certificate database of the certificate storage part 34 (S26).

After that, the management apparatus 30 transfers the update certificate being issued, with a certificate definition command to the management subject device 40 (S27).

When the management subject device 40 defines the update certificate attached with the certificate definition command as the official authentication information used to communicate with the management apparatus 30 (S28), and returns a response showing a definition result to the management apparatus 30 (S29). After that, the process for updating the regular certificate of the management subject device 40 by using the rescue authentication information is terminated.

In the above-described process for updating the regular certificate, if it is necessary to issue or define the public key or the root key certificate with the update certificate, the public key or the root key certificate is issued or defined with the update certificate. Alternatively, the certificate set may be formed by the public key certificate, the private key, and the root key certificate.

In the communication system 1000 shown in FIG. 1, even in a state in that the public key certificate forming the official authentication information cannot be authenticated in the management subject device 40, by the above-described process, this state is recovered by updating the certificate of the management subject device 40 so as to be a normal state in that the authentication can be conducted. Moreover, in a case in that the private key or the root key, which forms the official authentication information, is compromised or a like, only a stage in that the authentication process fails within the steps SII through S16, and processes after the step S17 are the same as described above.

Next, a data structure of the certificate database provided in the certificate storage part 34 of the management apparatus 30 will be described.

As shown in FIG. 15 and FIG. 16, for example, the certificate database includes two tables. In a first table shown in FIG. 15, a device number as the identification information of the issuance destination device (management subject device) of the public key certificate, a serial number of the public key certificate issued to the device at last, and an issued date of the public key certificate are registered by corresponding to each other.

Moreover, in a second table shown in FIG. 16, a serial number of the public key certificate, and contents of the pubic key certificate are registered by corresponding to each other. As the contents of the public key certificate, the public key certificate including bibliography items as shown in FIG. 10 is registered as it is. In addition to the serial number of the public key certificate and the contents of the public key certificate, or alternatively, a validated date of the public key certificate, a country of the issuance device, a region of the issuance device, and a like, which are extracted from the items in the bibliography information, may be registered.

Thus, in the second table, at a stage when the public key certificate is issued, the public key certificate is registered. Contents of the first table may be updated after the response showing a successful definition is received form the management subject device 40.

By preparing the above-described tables, the management apparatus 30 can obtain the public key certificate, which the management subject device 30 is supposed to store therein, (that is, the latest public key certificate issued to the management subject device 30 if the definition is not failed) from the certificate database.

In order to store all public key certificates including old public key certificates which were previously issued even after a new public key certificate is issued to the management subject device 40, the two tables shown in FIG. 15 and FIG. 16 are prepared. Moreover, since it is not preferable for a device other than the issuance destination device to maintain the private key, the private key is not registered in the two tables in FIG. 15 and FIG. 16. Since the same root key certificate is stored for a plurality of the management subject devices 40, the root key certificate is managed in another table (not shown), and can be acquired by using version key information of the root key certificate included in the public key certificate, so that a data amount can be reduced.

Figure 17:
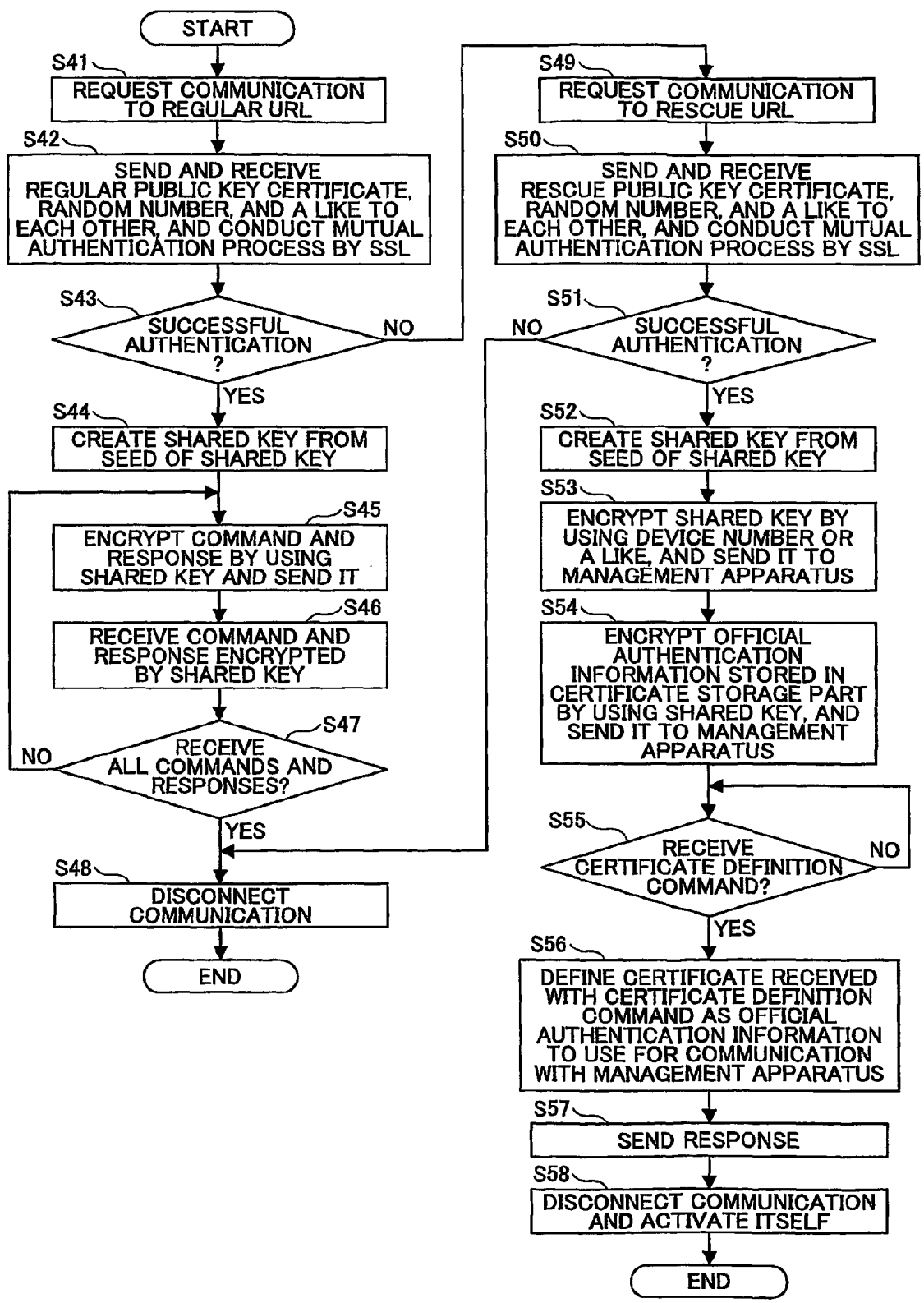
FIG. 17 is a flowchart for explaining a process conducted by the management subject device in a case of conducting the process shown in FIG. 14, according to the embodiment of the present invention.

Next, in a case of conducting the update process as shown in FIG. 14, a process conducted by the management subject device 40 will be described in detail. FIG. 17 shows a flowchart for explaining the process conducted by the management subject device 40. The process is conducted by the CPU of the management subject device 40 executing a predetermined control program.

The management subject device 40 begins the process in accordance with the flowchart in FIG. 17 when the management subject device 40 sends a command and a notice to the management apparatus 30, and conducts a polling process to receive a command and a notice from the management apparatus 30. First, in step S41, the management apparatus 30 sends the communication request to the regular URL of the management apparatus 30. It is assumed that the management subject device 40 stores the regular URL and the rescue URL as a communication request destination for the management apparatus 30 being the communication partner.

Subsequently, in step S42, the management subject device 40 sends and receives the regular public key certificate, the random number, and the seed of the shared key to and from the management apparatus 30, and conducts the mutual authentication using the SSL as shown in FIG. 1 with the management apparatus 30. Next, the management subject device 40 determines whether or not the authentication is successful in step S43. When the authentication is successful, the management subject device 40 establishes communication with the management apparatus 30, advances to step S44, and conducts a process according to a regular communication. Preferably, the authentication in the step S42 is the mutual authentication. However, at least if the management apparatus 30 can authenticate the management subject device 40, any one of the mutual authentication and the one-way authentication can be used.

In step S44, the shared key is generated from the seed of the shared key sent in the authentication process in the step S42. Subsequently, in step S45, the management subject device 40 encrypts by using the shared key and sends a command and a response with respect to a command received from the management apparatus 30 to a device (the management apparatus 30 in this case), which is communicating with the management subject device 40. In step S46, the management subject device 40 receives a command and a response with respect the above sent command, which are encrypted by using the same shared key, from the device (the management apparatus 30 in this case), which is communicating with the management subject device 40. In step S47, the management subject device 40 determines whether or not all commands and all responses are sent and received. If not all commands and all responses are sent and received, the management subject device 40 goes back to the step S45 to repeat the above-described process. If all commands and all responses are sent and received, the management subject device 40 advances to step S48, disconnects the communication with the management apparatus 30, and then terminates the process shown in FIG. 17.

A step order of the step S45 and the step S46 is not important. Also, if there is no command and response, the step S45 and the step S46 can be omitted. In addition, a process for conducting a process concerning a received command and generating a response, and a process for interpreting contents of a received response and conducting an operation corresponding to the received response are conducted separately from the process conducted in accordance with the flowchart shown in FIG. 17 while the received command and the received response are stored.

On the other hand, when the authentication fails in the step S43, the management subject device 40 advances to step S49, and conducts a process for acquiring the update certificate by using the rescue authentication information. However, if an authentication failure is not caused by an error, which does not originate from a communication error, an error of the certificate, and a like.

In steps after the step S49, in the step S49, the management subject device 40 sends the communication request to the rescue URL of the management apparatus 30. In step S50, the rescue public key certificate, the random number, and the seed of the shared key are sent and received between the management subject device 40 and the management apparatus 30, and the management subject device 40 conducts the mutual authentication process using the SSL as shown in FIG. 1.

In step S51, it is determined whether or not the authentication is successful. When the authentication fails, the management subject device 40 goes back to the step S48, and disconnects the communication with the management apparatus 30. When the authentication is successful, the management subject device 40 establishes a connection with the management apparatus 30, advances to step S52, and conducts processes for acquiring and defining the update certificate.

That is, first, in step S52, the shared key is generated from the seed of the shared key sent in the authentication process in the step S50. In step S53, the management subject device 40 sends information such as the device number encrypted by the shared key. In addition, in step S54, the management subject device 40 encrypts the official authentication information stored in the certificate storage part 46, by using the same shared key, and sends the official authentication information to the management apparatus 30. In the step S53 and the step S54, all necessary information may be described in a single message.

The information sent in the step S53 and the step S54 is used for the management apparatus 30 to examine whether or not the update certificate can be issued to the management subject device 40, and also is used as the identification information of the management subject device 40 to describe in the update certificate.

In addition, for example, a notice, which shows a cause of why the official authentication information being currently used cannot be available, can be information other than the device number sent in the step S53. Then, for example, as a cause to inform, it can be informed that the certificate cannot be automatically updated because a device is not connected while a memory unit of the device including the certificate storage part 46 is replaced, data are defective because a power is shut off while the certificate is updated, and a like.

Moreover, the official authentication information sent in the step S54 is information which the management subject device 40 attempted to use in the step S42, and is in a state in that the official authentication information cannot be normally authenticated because the official authentication information is defective, the validated date of the public key certificate is expired, or a like. However, in order to examine the management subject device 40 by the management apparatus 30, the official authentication information is sent to the management apparatus 30. Since an examination basis is different from the authentication process using the SSL, the official authentication information is sent to the management apparatus 30 even if the official authentication information has the above-described problem. In addition, the private key is not originally sent to another device. However, since the public key certificate corresponding to the private key cannot be used for the authentication, there is no problem even if the private key is recognized by another device when the private key is sent through a network.

Furthermore, the official authentication information includes the public key certificate, the private key, the root key certificate, and the like as shown in FIG. 8, but it is not required to send all. In addition, when the entire or a part of the official authentication information is defective, information showing the defect may be sent. Alternatively, the official authentication information may be sent by excluding information having the defect.

After the step S54, in step S55, the management subject device 40 waits until the management subject device 40 receives the certificate definition command from the management apparatus 30. As described above, if the authentication using the rescue public key certificate is conducted, operations concerning requests other than the certificate definition command are not conducted.

When the management subject device 40 receives the certificate definition command, the management subject device 40 advances to step S56, stores the certificate received with the certificate definition command, and defines the certificate as the official authentication information used for the communication with the management apparatus 30.

When the management subject device 40 ends the definition of the official authentication information, the management subject device 40 returns a response to the management apparatus 30 in step S57. Subsequently, the management subject device 40 disconnects the communication with the management apparatus 30, and reboots by itself. It is necessary to reboot in order to change important settings, for example, the settings of the certificate in this case. When management subject device 40 reboots again, the management subject device 40 may obtain a permission of a user. FIG. 17 shows that the process is terminated after the step S58, but the process is actually terminated when the management subject device 40 reboots in the step S58. Alternatively, the process may be terminated without the reboot.

In FIG. 17, the case of updating the certificate when the regular public key certificate of the management subject device 40 is defective or is expired is described. However, there is another case in that the management apparatus 30 preferably examines the management subject device 40 when the certificate is updated.

Figure 18:
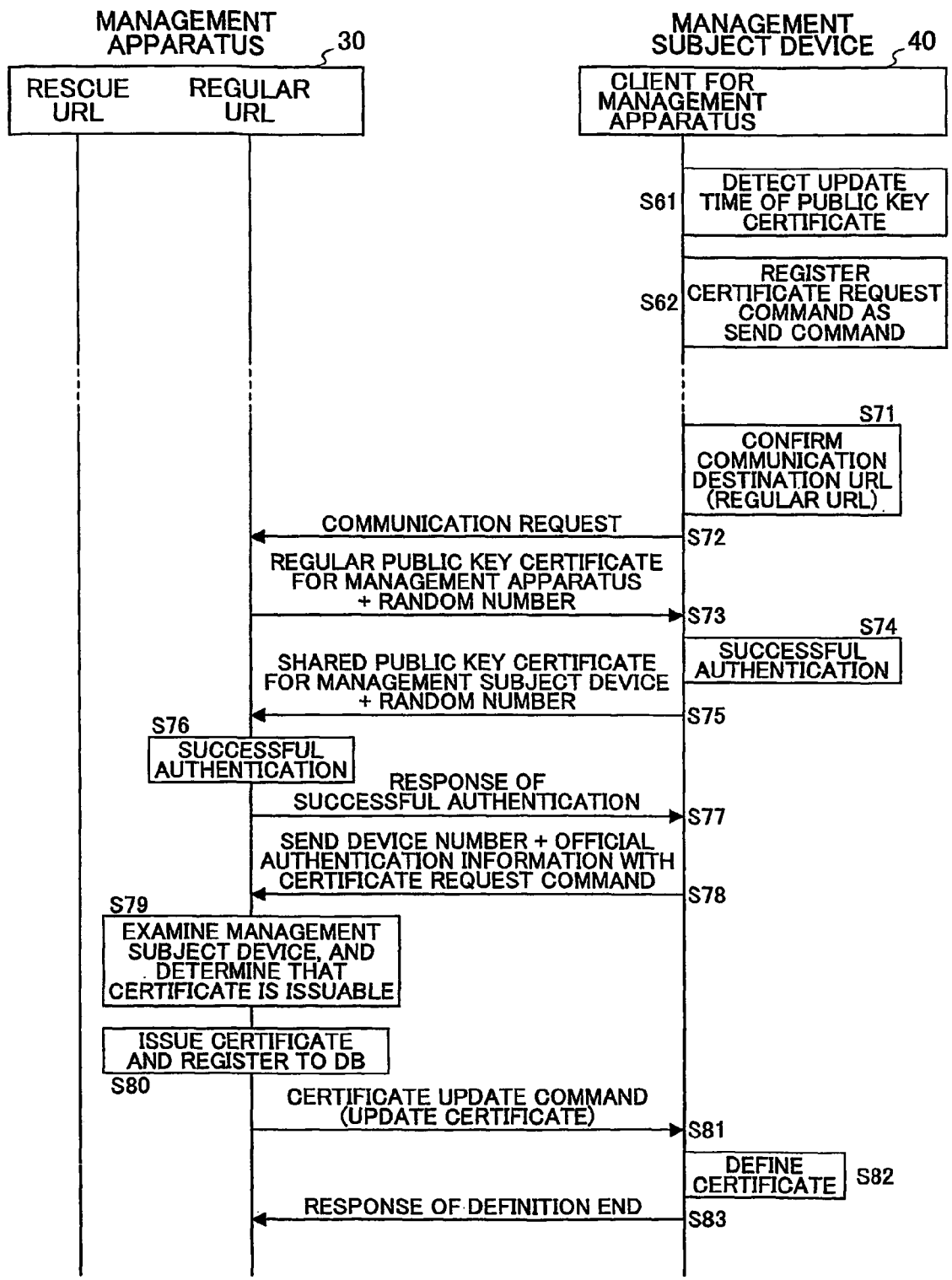
FIG. 18 is a sequence diagram showing a flow of a process conducted by the management subject device when the official authentication information is updated in a case in that the management apparatus examines the management subject device as an issuance destination in order to update the official authentication information by using the regular communication with the management subject device, according to the embodiment of the present invention.

FIG. 18 shows a sequence flow of the entire update process of the official authentication information in another case.

In this case, when the management subject device 40 detects that it is a certain term before the validated date of the public key certificate used for the authentication process between the management subject device 40 and the management apparatus 30 (S61), the management subject device 40 determines that it is a time to update the official authentication information, and registers a certificate request command for requesting the management apparatus 30 to the pubic key certificate and the like to update, as a command to send to the management apparatus 30 in a process for sending the regular command in the step S45 in FIG. 17.

After that, at a pertinent timing, the management subject device 40 sends the communication request to the regular URL of the management apparatus 30. In this case, the mutual authentication is conducted by using the official authentication information. If there is no problem with the authentication information, detailed explanation will be the same as one in FIG. 14, and will be omitted. Then, the authentication process is successful (S71, S72, S73, S74, S75, S76, and S77). The public key certificate of the management subject device 40 used in this authentication is the shared public key certificate.

When the authentication is successful, the management subject device 40 sends the certificate request command registered in the step S62 to the management apparatus 30 (S78). In the step S78, the device number and the official authentication information stored in the certificate storage part 46 are also sent to the management apparatus 30. For example, the device number and the official authentication information are sent as arguments of the certificate request command.

Then, the certificate examination part 35 of the management apparatus 30 examines the management subject device 40 based on the device number and the official authentication information, and determines that the update certificate can be issued (S79). Then, the certificate issuance part 36 issues the update certificate, and also registers the public key certificate being issued, the identification information of the issuance destination device, and the like to the certificate database (S80).

After that, the update certificate issued in the step S80 and the certificate definition command are sent to the management subject device 40 (S81).

When the management subject device 40 receives the certificate definition command and the update certificate, the management subject device 40 defines the update certificate attached with the certificate definition command as the official authentication information used for the communication with the management apparatus 30 (S82), the management subject device 40 returns a response showing a definition result to the management apparatus 30 (S83).

As described above, the update process for the regular certificate conducted by the management subject device 40 is terminated. The update certificate issued in the step S80 is preferably an individual public key certificate describing the device number received in the step S78 and the identification information of the issuance destination device. Also, the management subject device 40 receives the certificate update command sent in the step S81 in a regular command receiving process conducted in the step S46 in FIG. 17, and then conducts a process concerning the received command.

Next, a process by the management apparatus 30 will be described with reference to FIG. 19 and FIG. 20 in the update process of the official authentication information described with reference to FIG. 14 through FIG. 18. The process is stared when the CPU 11 of the management apparatus 30 receives the communication request at the rescue URL, and is conducted by the CPU 11 executing a predetermined program. Moreover, processes after step S95 are conducted when the communication request is received at the regular URL, and when the certificate request command is received while a command is regularly sent and received. A process concerning a regular command transmission, which is conducted when the CPU of the management apparatus 30 receives the communication request at the regular URL, is conducted independently of the processes shown in FIG. 19 and FIG. 20.

Figure 19:
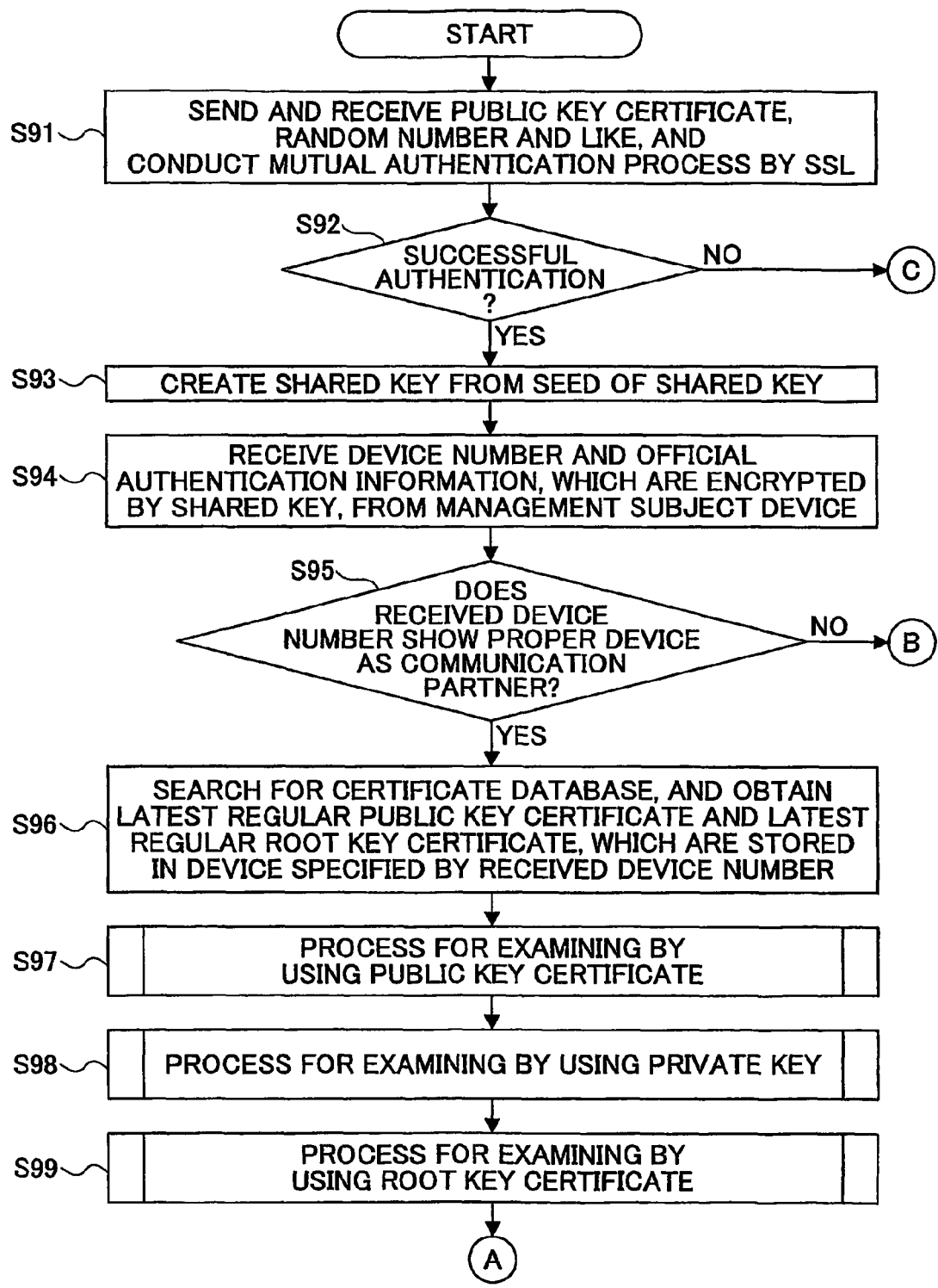
FIG. 19 is a sequence diagram showing a flow of a process conducted by the management apparatus when the official authentication information is updated in a case in that the management apparatus examines the management subject device as an issuance destination in order to update the official authentication information by using the regular communication with the management subject device, according to the embodiment of the present invention.

In the process shown in FIG. 19, first, in step S91, the CPU 11 of the management apparatus 30 sends and receives the rescue public key certificate with the random number and the seed of the shared key between the management apparatus 30 and a sender device of the communication request (the management subject device 40 in this case), and conducts the mutual authentication process using the SSL as shown in FIG. 1.

Then, the management apparatus 30 determines whether or not this authentication is successful in step S92. When the authentication is not successful, the management apparatus 30 advances to step S108 in FIG. 20, disconnects the communication with the sender device, and terminates this process. On the other hand, when the authentication is successful, the management apparatus 30 establishes communication with the sender device of the communication request, advances to step S93. In the following steps, the management apparatus 30 conducts processes concerning an examination of the sender device of the communication request, and a definition of the update certificate. Also, when the authentication is successful, the management apparatus 30 can recognize which management subject device is the sender device of the communication request. In the following, it is assumed that the sender device of the communication request is the management subject device 40.

In the process, first, in step S93, the shared key is generated form the seed of the shared key received in the authentication process in the step S91. Subsequently, in step S94, the device number, the official authentication information, and the like, which are encrypted by using the shared key, are received from the management subject device 40. However, in a case in that the management subject device 40 does not send the entire official authentication information, the management apparatus 30 receives only a part of the official authentication information, or the management apparatus 30 may not receive the entire official authentication information.

A process in the step S94 corresponds to a step of receiving a public key certificate, and the CPU 11 of the management apparatus 30 functions as a receiving means.

After the step S94, the management apparatus 30 advances to step S95, and determines whether or not the device number shows a proper device as the communication partner. In a case of conducting this process as a process concerning the certificate request command (the management subject device 40 is defined as the sender device), in addition to the certificate request command, the device number received with the certificate request command is also determined.

If it is determined that the management subject device 40 is not a proper communication partner, without conducting the following examination, it can be recognized that the update certificate cannot be issued to the management subject device 40. The management apparatus 30 advances step S109 in FIG. 20. In the step S109, the management apparatus 30 sends a message describing an examination failure and a reason of the examination failure, to the management subject device 40. In step SllO, the management apparatus 30 informs the examination failure and the reason thereof to an operator of the management apparatus 30, disconnects the communication with the management subject device 40, and terminates this process. For example, it can be considered that although the management subject device 40 is to be a management subject for the management apparatus 30, the management subject device 40 is not registered as the management subject because the management contract has not been agreed.

On the other hand, when it is determined that the management subject device 40 is the proper communication partner, the management apparatus 30 advances to step S96. In the step S96, the certificate database (refer to two tables shown in FIG. 15 and FIG. 16) of the certificate storage part 34 is searched for by using the device number received in the step S94, and the information concerning the latest regular public key certificate and the latest regular root key certificate, which are assumed that the management subject device 40 stores, is acquired. The information is acquired from a different location from the management subject device 40. Also, the information to be acquired can be the entire or a part of the public key certificate. For example, the information can be essential information such as the root key certificate, a serial number of the certificate, the identification information of the issuance destination apparatus, the validated date, the issued date, or the like, which are extracted from the public key certificate. That is, the above essential information is sufficient to conduct the examination in steps S97, S98, and S99. Moreover, the public key certificate being acquired may be the shared public key certificate.

A process in the step S96 is a step of acquiring information, and the CPU 11 of the management apparatus 30 functions as an acquiring means.

Next, the step S97 is a process for conducting the examination using the public key certificate received in the step S94, and the management subject device 40 is examined by using the public key certificate received from the management subject device 40 in the step S94 and the information acquired in the step S96. An examination result is registered in a result table. Various methods can be considered how to examine the management subject device 40 by using the public key certificate. At least, when the public key certificate is received in the step S94, it is determined that the public key certificate is identical to another public key certificate stored in a device specified by the device number received in the step S94. For example, by comparing the entire public key certificate received from the management subject device 40 and the entire public key certificate acquired from the certificate database, by partially comparing both public key certificate with each other, or by comparing parameters extracted from both public key certificates with each other, it can be determined that the management subject device 40 is the proper communication partner when both public key certificates are identical to each other.

Figure 21:
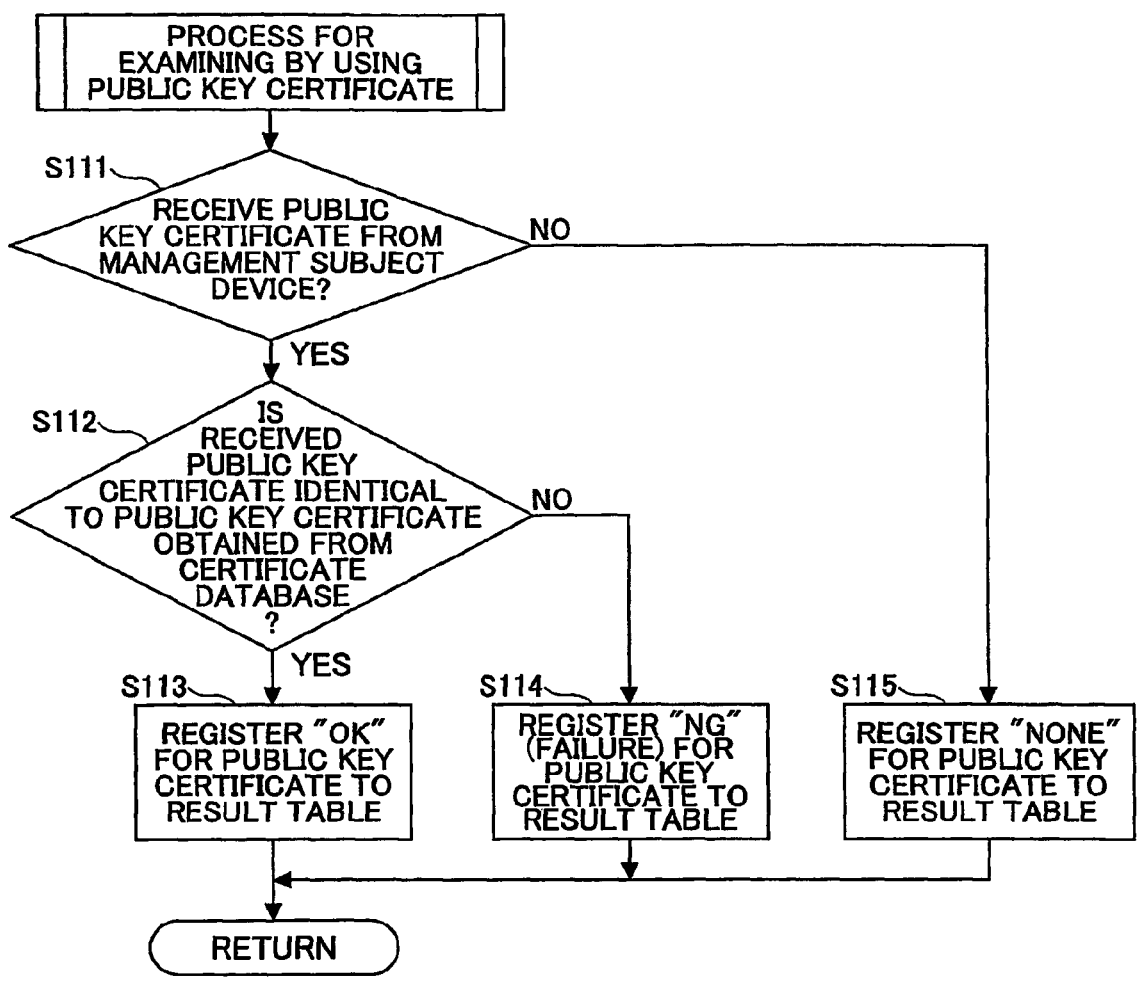
FIG. 21 is a flowchart showing an example of the examination process using the public key certificate shown in step S97 in FIG. 19, according to the embodiment of the present invention.

FIG. 21 shows a flowchart for explaining a process example of the examination process using the public key certificate in step S97.

In the examination process, first, in step Sill, it is determined whether or not the public key certificate is received from the management subject device 40 as the official authentication information in step S94 in FIG. 19. If the public key certificate is received as the official authentication information, the examination process advances to step S112, and it is determined whether or not the public key certificate received in the step S94 is identical to the public key certificate acquired from the certificate database in the step S96 in FIG. 19.

If the public key certificate received in the step S94 is identical to the public key certificate acquired from the certificate database in the step S96, it is determined that the public key certificate received in the step S94 is a certificate which the management subject device 40 stores. This determination result supports that the communication partner is the management subject device 40. Accordingly, in step S113, "OK" is registered to the result table as the examination result of the public key certificate, and the examination process returns. On the other hand, if the public key certificate received in the step S94 is not identical to the public key certificate acquired from the certificate database in the step S96, it is determined that the communication partner is not the management subject device 40. In step S114, "NG" is registered to the result table as the examination result, and the examination process returns.

If the public key certificate is not received in the step Sill, "NONE" is registered as the examination result in step S115, and the examination process returns.

For example, the examination process in the step S97 in FIG. 19 can be realized by conducting the above-described steps Sill through S115.

In general, since the public key certificate is not maintained as secret data and is sent to the communication partner if necessary, even if a device stores the public key certificate, it is difficult to determine that the device is the issuance destination device to which the public key certificate is issued.

However, in the communication system 1000 in that only a specific communication partner is allowed to communicate and the public key certificate is provided to only a specific device, it is low possibility that a completely irrelevant device stores the public key certificate of the management subject device 40. Also, if a device as the communication partner of the management subject device 40 is a product of the same vendor as the management subject device 40, it is possible to control so that the communication partner does not have the public key certificate, and the public key certificate is not transferred to another device.

For example, a system is architected with the assumption that the management subject device 40 is arranged inside a firewall. In communication between the management subject device 40 and the management apparatus 30, the management subject device 40 is always on a side of calling the management apparatus 30, and the management subject device 40 does not send the communication request to any apparatus other than the management apparatus 30. Accordingly, the public key certificate of the management subject device 40 is not sent to any apparatus other than the management apparatus 30. Moreover, in the management subject device 40, the public key certificate is stored in a memory such as a flash ROM (Read Only Memory), an EPROM (Erasable Programmable Read Only Memory) fixed on a substrate, in a scramble state. It is possible to prevent the public key certificate from being read out off-line, and it is possible to further prevent the public key certificate of the management subject device 40 from being stored in any device and apparatus other than the management subject device 40 and the management apparatus 30.

Accordingly, in this case, if the management apparatus 30 receives the public key certificate, in which it is assumed by the management apparatus 30 that a device having a specific device number stores the public key certificate, it is determined that the device actually sent the public key certificate with higher certainty. Especially, in a case in that the communication partner of the management subject device 40 is the management apparatus 30 alone, the public key certificate issued to the management subject device 40 is stored only in the management subject device 40 and the management apparatus 30. Thus, when the management apparatus 30 receives the public key certificate which is the same as the public key certificate managed in the management apparatus 30, the management apparatus 30 determines that the device is the specific device specified by a relative device number.

Moreover, referring to a flowchart in FIG. 22, another example of the examination process using the public key certificate in the step S97 will be described. It is preferable to apply the examination process in FIG. 22 when a process corresponding to the certificate request command is conducted.

Figure 22:
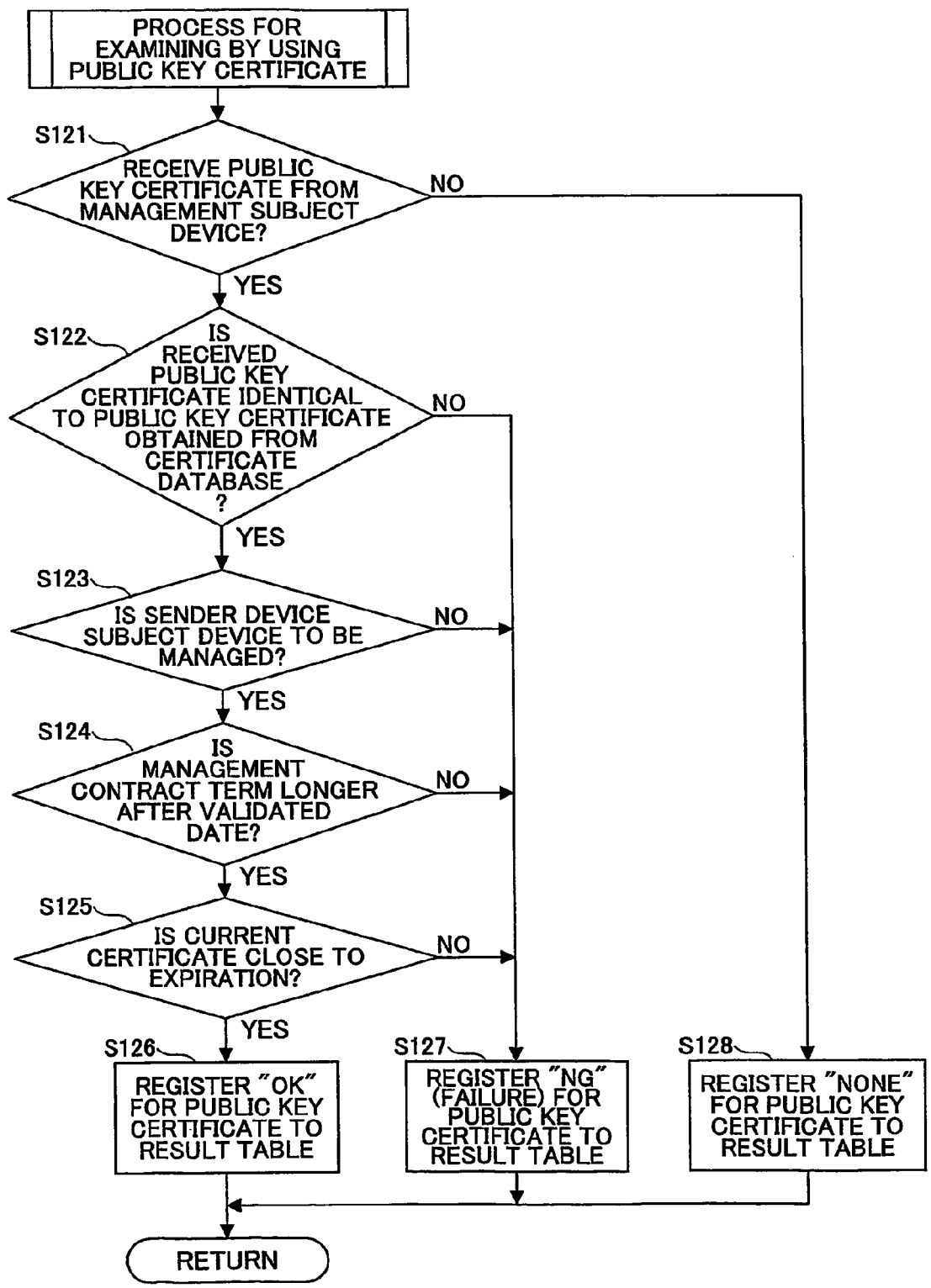
FIG. 22 is a flowchart showing another example of an examination process using the public key certificate shown in step S97 in FIG. 19, according to the embodiment of the present invention.

In the examination process in FIG. 22, first, in step S121 and step S122, an examination is conducted similarly to the step Sill and the step S112 in FIG. 21.

After that, by using information such as the device number received from the management subject device 40, and the validated date of the public key certificate received from the management subject device 40, and by referring to a table (not shown) recording information concerning a device as the management subject by using the above information as a key, it is determined whether or not the management subject device 40 is the device as the management subject, and the management contract term for the management subject device 40 is longer than the validated data of the public key certificate being currently used (S123, and S124).

For any device which is not the management subject, it is not necessary to further maintain communication to be available. If the management contract term is expired within the validated date of the public key certificate being currently used, it is not necessary to further maintain communication to be available. Thus, if a determination result in the step S123 or S124 shows "NO", an examination NG (failure) is set in step S127, and the examination process returns.

In step S124, when the validated date of the public key certificate is defined based on the management contract term, it may be determined whether or not the management contract is extended.

Moreover, if both determination results in the step S123 and the step S124 show "YES", the examination process advances to step S125, and it is determined whether or not a present public key certificate is close to expiration (for example, within one month before the validated date). Since the certificate request command is sent close to expiration, when this determination result shows "NO", it is considered that an abnormal event occurs, the examination "NG" (failure) is set in the step S127, and the examination process returns.

Furthermore, all determination results in the steps S121 through S125 show "YES", the examination "OK" (successful) is set in the step S126, and the examination process returns.

By the above-described examination process, the device sending the device number is examined, and it can be determined whether or not the public key certificate can be issued. FIG. 21 and FIG. 22 simply show examples of items to determine in the examination process. In response to a usage of the management subject device 40, a management operation conducted by the management apparatus 30, or a like, the items can be approximately defined.

Referring to FIG. 19 again, in next step S98, an examination process using the private key received in the step S94 is conducted. The management subject device 40 is examined by using the private key received from the management subject device 40 in the step S94, and the information acquired in the step S96, and the examination result is registered in the result table. Various methods can be considered to conduct the examination using the private key. At least, when the private key is received in the step S94, it is determined whether or not the private key corresponds to the public key stored in the device specified the device number received in the step S94. For example, appropriate data are encrypted by using either one of the private key received from the management subject device 40 and the public key included in the public key certificate acquired from the certificate database, and the appropriate data are decrypted by using another one of the private key and the public key. When original data is properly reproduced by this decryption, it is determined that the private key received from the management subject device 40 is a proper private key.

Referring to a flowchart in FIG. 23, an example of the examination process using the private key in the step S98 will be described.

In this examination process, first, in step S141, it is determined whether or not the private key is received from the management subject device 40 as the official authentication information in the step S94 in FIG. 19. If the private key is received, the examination process advances to step S142, and appropriate data are encrypted by using the private key. In step S143, the encrypted data are decrypted by using the public key included in the public key certificate acquired from the certificate database in the step S96 in FIG. 19. If the encrypted data are decrypted by using the private key and the public key included in the pubic key certificate received from the management subject device 40, it is simply recognized that the management subject device 40 stores the private key and the public key corresponding the private key. Thus, it is not effective to use the public key from the management subject device 40, instead of using the public key included in the public key certificate acquired from the certificate database.

Subsequently, it is determined whether or not the decryption is successful in step S144, that is, it is determined whether or not a decryption result shows original data before the encryption.

If the original data are reproduced, it is determined that the private key received in the step S94 corresponds to the public key managed by the management apparatus 30. As a result, it is confirmed that the communication partner is the management subject device 40. The examination result of the private key is registered as "OK" in the result table in step S145, and the examination process returns. On the other hand, if the original date is not reproduced, it is confirmed that the communication partner is not the management subject device 40. Thus, the examination result is registered as "NG" (failure) in the result table in step S146, and the examination process returns.

Moreover, if the private key is not received in the step S141, the examination result of the private key is registered as "NONE" in the result table in step S147, and the examination process returns.

For example, the examination process in the step S98 in FIG. 19 is conducted as described above.

The private key is generally data which only the issuance subject device stores. If a device sends the private key which a device having a certain device number stores, actually the device having the certain device number sends the private key at higher possibility. However, if the management apparatus 30 stores the private key issued to each device for a comparison, the management apparatus 30 can be disguised to be the management subject device 40. This case is not preferable in a system design. Accordingly, in the example shown in FIG. 23, it is confirmed that the received private key corresponds to the private key which is considered as the public key stored by the device having the certain device number, so that it is possible to indirectly confirm that the received private key is the private key assumed to be stored in the device having the certain device number.

Alternatively, it can be technically possible that the private key is stored in the certificate database, and the private key received from the management subject device 40 is compared with the private key acquired from the certificate dataset.

Referring to FIG. 19 again, in next step S99, an examination process using the root key certificate received in the step S94 is conducted. In the step S99, the management subject device 40 is examined by using the root key certificate received from the management subject device 40 in the step S94, and the information acquired in the step S96, and the examination result is registered in the result table. Various methods can be considered to conduct the examination process using the root key certificate. A method for the examination process using the root key certificate can be similar to the public key certificate, and an explanation thereof will be omitted. In a detailed process example, all descriptions of "public key certificate" are replaced with "root key certificate" and a similar method can be applied.

Similar to the public key certificate, the root key certificate is not generally maintained as secret data. Also, the public key certificate is stored in common in devices belonging to the same level of the management subject device 40. Accordingly, even if a device stores the root key certificate, it is difficult to recognize the device as a specific device.

However, once the root key certificate is defined in the device, since the root key certificate is not generally sent to an external device, there is a low possibility that a completely irrelevant device stores the root key certificate. Accordingly, in this case, if a device sends the root key certificate, which is considered by the management apparatus 30 to be stored in a device being a specific level, at least, it can be determined with high certainty that actually the device itself being the specific level sent the root key certificate.

Moreover, in a case of mixing the public key certificates of a plurality of versions and relative root key certificates, if the communication partner sends the root key certificate corresponding to the public key certificate managed by the management apparatus 30, it can be recognized that the communication partner is actually a device specified by the device number sent from the communication partner.

The examination result of the examination process using the root key certificate shows lower reliability than the examination process using the public key certificate or the private key. However, by combining with at least one of the examination processes using the public key certificate and the private key, it can be sufficiently useful.

Figure 20:
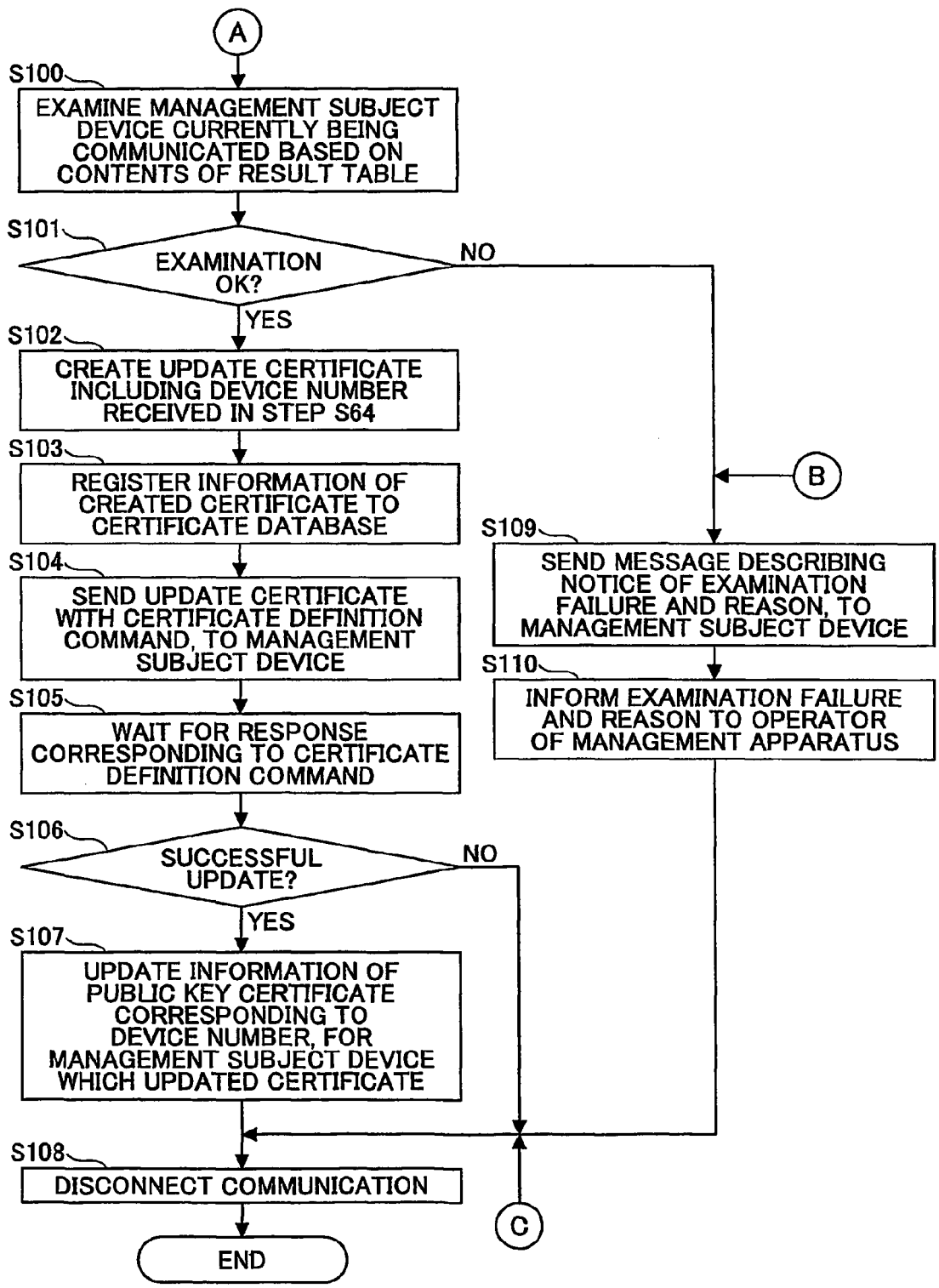
FIG. 20 is a sequence diagram showing a continued flow from FIG. 19 of a process conducted by the management apparatus when the official authentication information is updated in a case in that the management apparatus examines the management subject device as an issuance destination in order to update the official authentication information by using the regular communication with the management subject device, according to the embodiment of the present invention.

After the step S99, the examination process advances to step S100 in FIG. 20. By using contents of all examination results registered in the result table in the steps S97 through S99, a conclusive examination is conducted with respect to the management subject device 40 being communicated with the management apparatus 30. In this examination, examination "OK" is set when it is determined that the communication partner is the device specified by the device number received in the step S94. On the other hand, the examination "NG" (failure) is set when the communication partner is not the device specified by the device number received in the step S94.

For example, as this basis, if all examination results show "OK" for the public key certificate, the private key, and the root key certificate, a conclusive result is set to be "OK". On the other hand, the conclusive result is set to be "NG" (failure). Alternatively, even if one of the examination results shows "NONE", the conclusive result may be set as "OK". Moreover, instead of setting "OK" and "NG" (failure), a warning may be issued to urge an operator of the management apparatus 30 to determine the conclusive result. These bases can be appropriately defined based on an operation basis of the management apparatus 30 by the vendor, a usage and a function of the management subject device 40, or a like.

Also, when information showing a cause of why the official authentication information cannot be used is received in the step S94, the information may be used for the examination. For example, the examination basis may be changed based on the cause.

The steps S97 through S100 are of examining a communication device, and the CPU 11 of the management apparatus 30 functions as an examining means. It should be noted that it is not mandatory to conduct all steps S97 through S99, and at least one of the steps S97 though S99 may be conducted.

Next, in step S101, it is determined whether or not the examination result in the step S100 is OK. When the examination result in the step S100 is OK, the management apparatus 30 advances to step S102 to conduct a certificate update process.

In the step S102, by the function of the certificate issuance part 36, the update certificate including the device number received in the step S94 is created. In the example shown in FIG. 10, the identification information of the issuance subject device other than the device number is described in the public key certificate. In a case of describing the identification information, the management apparatus 30 may refer to a database, or cause the management subject device 40 to send the identification information.

After the step S102, in step S103, information for the certificate created in the step S102 is registered to the certificate database. In this process, for example, in a case of using the certificate database in formats as shown in FIG. 15 and in FIG. 16, the public key certificate is registered to the second table shown in FIG. 16.

Next, in step S104, the certificate created in the step S102 is sent to the management subject device 40. Simultaneously, the management apparatus 30 sends the certification definition command for requesting the management subject device 40 to define as a certificate used for communication with the management apparatus 30.

The management apparatus 30 waits for a response with respect to the certificate definition command in step S105. When the management apparatus 30 receives the response from the management subject device 40, the management apparatus 30 advances to step S106, and determines whether or not an update of the certificate is successful. If the update of the certificate is successful, in step S107, the management apparatus 30 updates information of the public key certificate corresponding to the device number for the management subject device 40 which the management apparatus 30 cause to update the certificate. In detail, the management apparatus 30 updates information of the serial number and the issued date registered in the first table shown in FIG. 15 with information shown in the certificate sent in the step S104. After that, in step S108, the management apparatus 30 disconnects the communication with the management subject device 40, and terminates this process.

When the update of the certificate is not successful in the step S106, the management apparatus 30 disconnects the communication with the management subject device 40, and terminates this process. Similarly, the communication is disconnected and this process is terminated if the management apparatus 30 has not received the response from the management subject device 40 for a predetermined time in the step S105. In this case, the management subject device 40 may access the management apparatus 30 again. Thus, there is no problem if the management apparatus 30 disconnects the communication with the management subject device 40. In this case, it is assumed that the management subject device 40 still stores the same official authentication information as before the update of the certificate. Accordingly, the management apparatus 30 does not update the first table shown in FIG. 15.

On the other hand, when the examination result in the step S101 is not "OK", the management apparatus 30 advances to step S109. In the step S109, the management apparatus 30 sends a message showing the examination failure and a reason to the management subject device 40 being the communication partner. In step S110, the management apparatus 30 also informs the examination failure and the reason to an operator of the management apparatus 30. In step S108, the management apparatus 30 disconnects the communication with the management subject device 40, and terminates this process. Alternatively, if it is not proper to inform the examination failure and the reason to the management subject device 40, the management apparatus 30 simply disconnects the communication, or sends a dummy message to the management subject device 40 before the disconnection.

In the communication system 1000 shown in FIG. 1, by conducting the above-described processes, even in a case in that the public key certificate, which is used for the regular authentication process between the management apparatus 30 and the management subject device 40, cannot be used at the management subject device 40, and even in a case in that it is necessary to identify a communication device by using the public key certificate, which is relatively lower security, the pubic key certificate of the management subject device 40 can be updated, and it is possible to recover to be a state possible to conduct the regular authentication process between the management apparatus 30 and the management subject device 40, again.

Also, in this case, even in a case of using the emergency communication path using the rescue authentication information, which relatively easily allows spoofing, the official authentication information stored in the management subject device 40 is sent to the management apparatus 30 with the device number, the management apparatus 30 examines the management subject device 40 based on the official authentication information and the device number. Therefore, it is possible to eliminate spoofing at a relatively higher possibility, and it is possible to prevent the update public key certificate from being illegally acquired.

Moreover, in a case of using the shared public key certificate as the regular public key certificate included in the official authentication information, it is possible to eliminate spoofing when the certificate is updated, and the same effects can be obtained.

In addition, according to the method described above, since the public key certificate can be automatically updated, especially, it is effective to apply the method to an apparatus, at a location of which an operator cannot update the certificate, for example, such as an examination apparatus for conducting an examination when the public key certificate is sent to an image forming apparatus or a like being a remote maintenance subject such as a set top box of a cable television set, or an communication system including the examination apparatus.

Next, a preferable configuration of the certificate storage part 46 in the management subject device 40 will be described.

Figure 24:
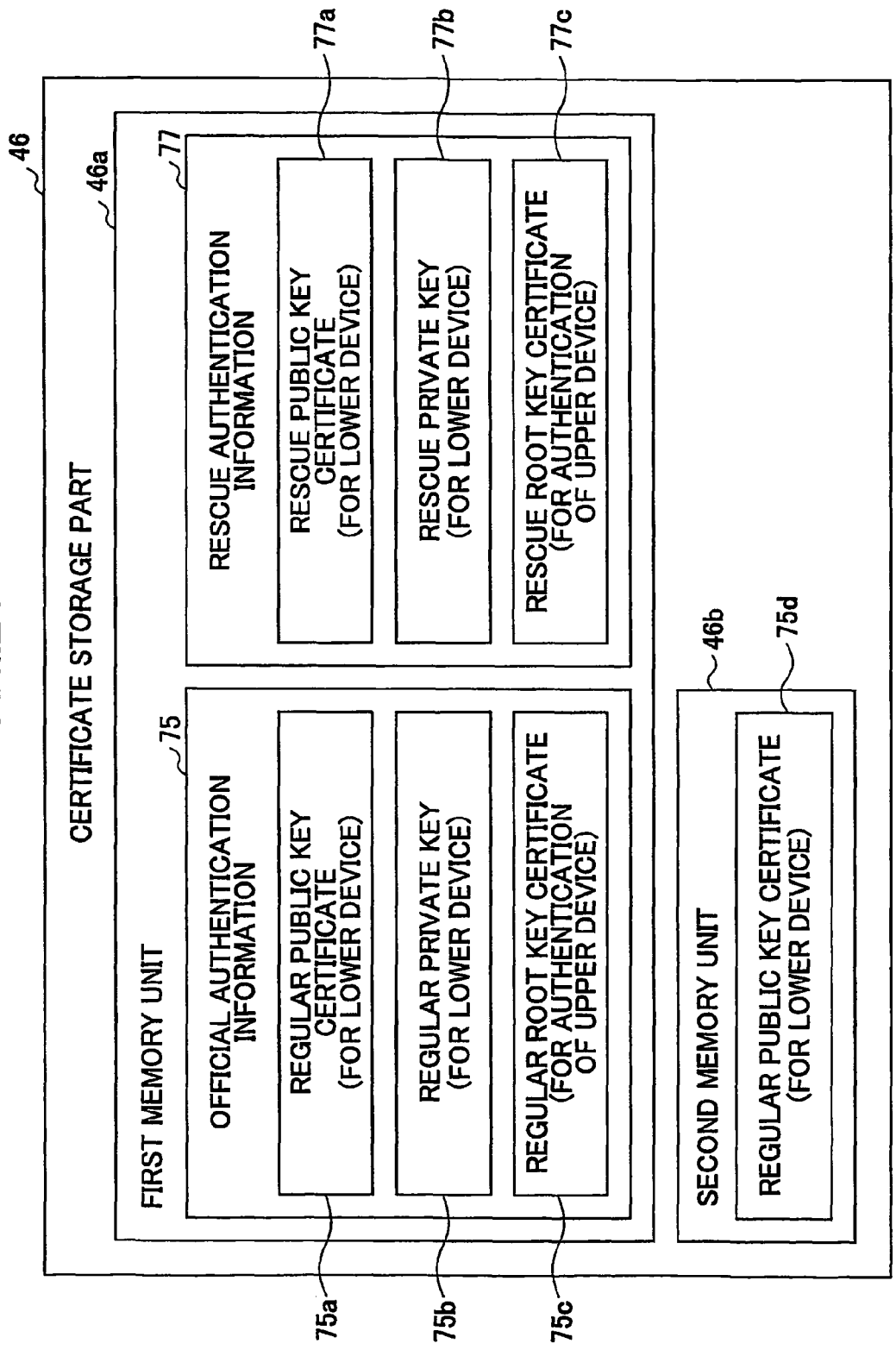
FIG. 24 is a diagram for explaining an example of a configuration of the certificate storage part of the management subject device shown in FIG. 6, according to the embodiment of the present invention.

First, FIG. 24 shows a configuration example of the certificate storage part 46.

In the management subject device 40, as shown in FIG. 24, as a memory configuring the certificate storage part 46, a first memory unit 4β*a* and a second memory unit 46*b*, which are replaceable, are arranged independently. For example, in the first memory unit 46*a*, as shown in FIG. 8A, the official authentication information and the rescue authentication information are stored. In the second memory unit 46*b*, the entire or a part of the official authentication information may be stored. In FIG. 24, the second memory unit 46*b* stores the regular public key certificate. Alternatively, the regular private, the regular root key certificate, or a combination thereof may be stored. As the first and second memory units 46*a* and 46*b*, replaceable non-volatile memories are used. For example, an SRAM (Static Random Access Memory) a flash memory, an SD card, a hard disk drive, or a like can be used.

The first memory unit 46*a* includes an official authentication information 75 including the regular public key certificate 75*a* for a lower device, a regular private key 75*b* for the lower device, and a regular root key certificate 75*c* for authenticating an upper device, and a rescue authentication information 77 including a rescue public key certificate 77*a* for the lower device, a rescue private key 77*b* for the lower device, and a rescue root key certificate 77*c* for authenticating the upper device. The second memory unit 46*b* includes a regular public key certificate 75*d* for the lower device.

Even in the configuration shown in FIG. 24, generally, the authentication process is conducted by using the official authentication information stored in the first memory unit. However, during an operation of the management subject device 40, the first memory unit 46*a* may be required to be replaced because the first memory unit 46*a* is damaged, or a motherboard mounting the first memory unit 46*a* may be required to be replaced because the motherboard is damaged.

In this case, if the rescue authentication information does not include the identification information of the management subject device 40, since at least regarding the management subject device 40 being the same device type, the rescue authentication information is shared the same information, it is possible to record the rescue authentication information to a new second memory unit 46*b* used for replacement when the new second memory unit 46*b* is manufactured. Then, the management subject device 40 can request the management apparatus 30 to communicate with each other by using the rescue authentication information, and can request the management apparatus 30 to issue new official authentication information.

However, if only the first memory unit 46*a* stores the official authentication information, when first memory unit 46*a* is removed from the management subject device 40, the management subject device 40 does not include the official authentication information within itself. Thus, when the new official authentication information is requested, the management subject device 40 cannot be examined by the management apparatus 30 because the official authentication information cannot be provided to management apparatus 30. In addition, in a case in that the examination cannot be successful when the examination result shows "NONE" because of higher security based on the examination basis at the management apparatus 30, the management subject device 40 cannot pass the examination, and cannot receive the new official authentication information.

Figure 25:
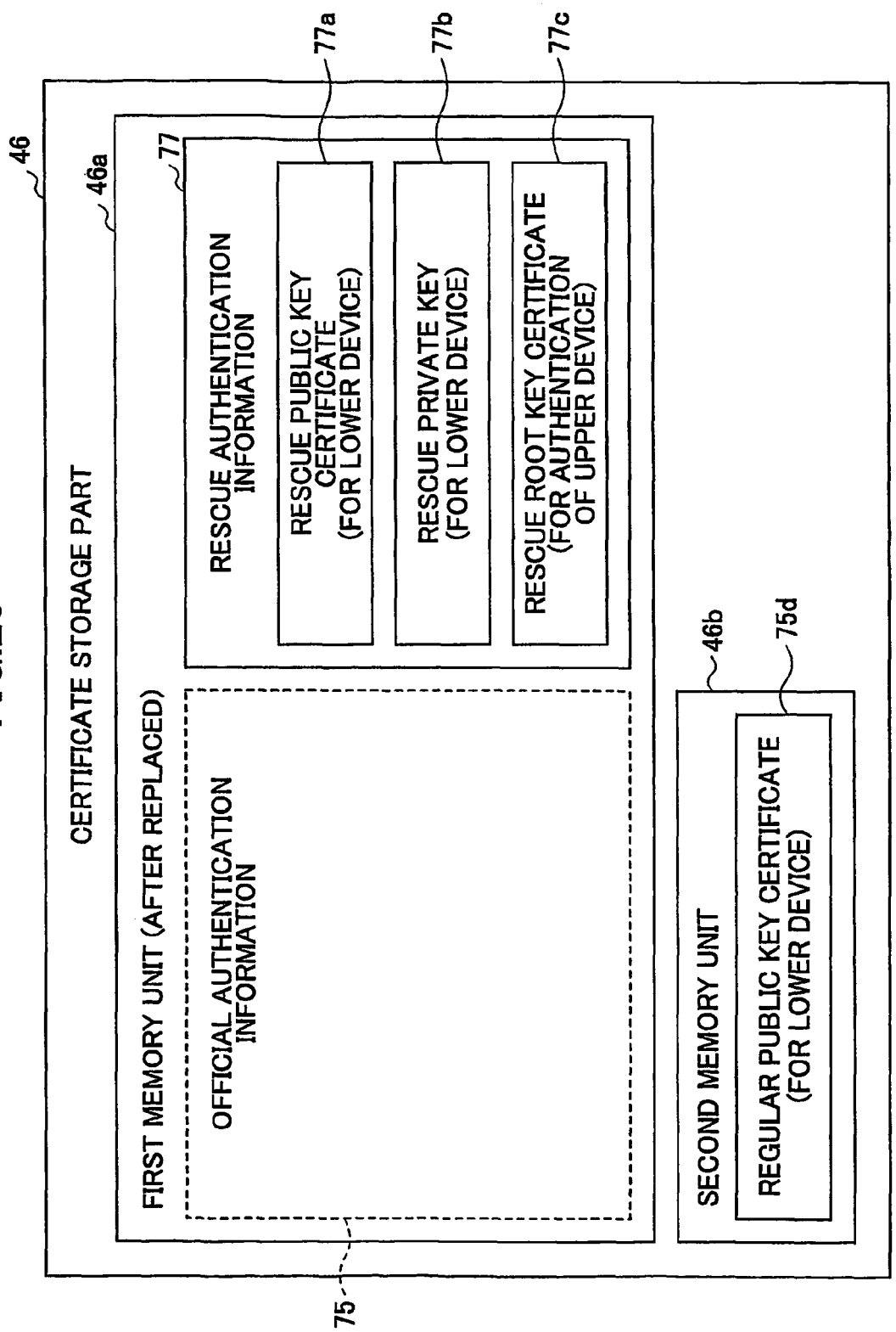
FIG. 25 is a diagram for explaining another example of a configuration of the certificate storage part of the management subject device shown in FIG. 6, according to the embodiment of the present invention.

On the other hand, if the second memory unit 46*b* stores the official authentication information, as shown in FIG. 25, the official authentication information stored still remains in the second memory unit 46*b* even in a case of removing the first memory unit 46*a*. Accordingly, the management subject device 40 can be examined by sending the official authentication information to the management apparatus 30. If the official authentication information is proper information, the management subject device 40 can pass the examination and receive the new official authentication information issued by the management apparatus 30 as the update official authentication information.

Moreover, the management subject device 40 may store the update official authentication information received from the management apparatus 30 to the first memory unit 46*a* and also may store the entire or a part of update official authentication information to the second memory unit 46*b*, so as to realize an original state as shown in FIG. 24.

As described above, in the communication system 1000 in the embodiment, it is effective for the management subject device 40 to distribute and store the public key certificate and the private key forming the official authentication information to a plurality of memory units being independent of each other and replaceable. In this case, the public key certificate and the private key may be stored to a plurality of memory units.

Figure 26:
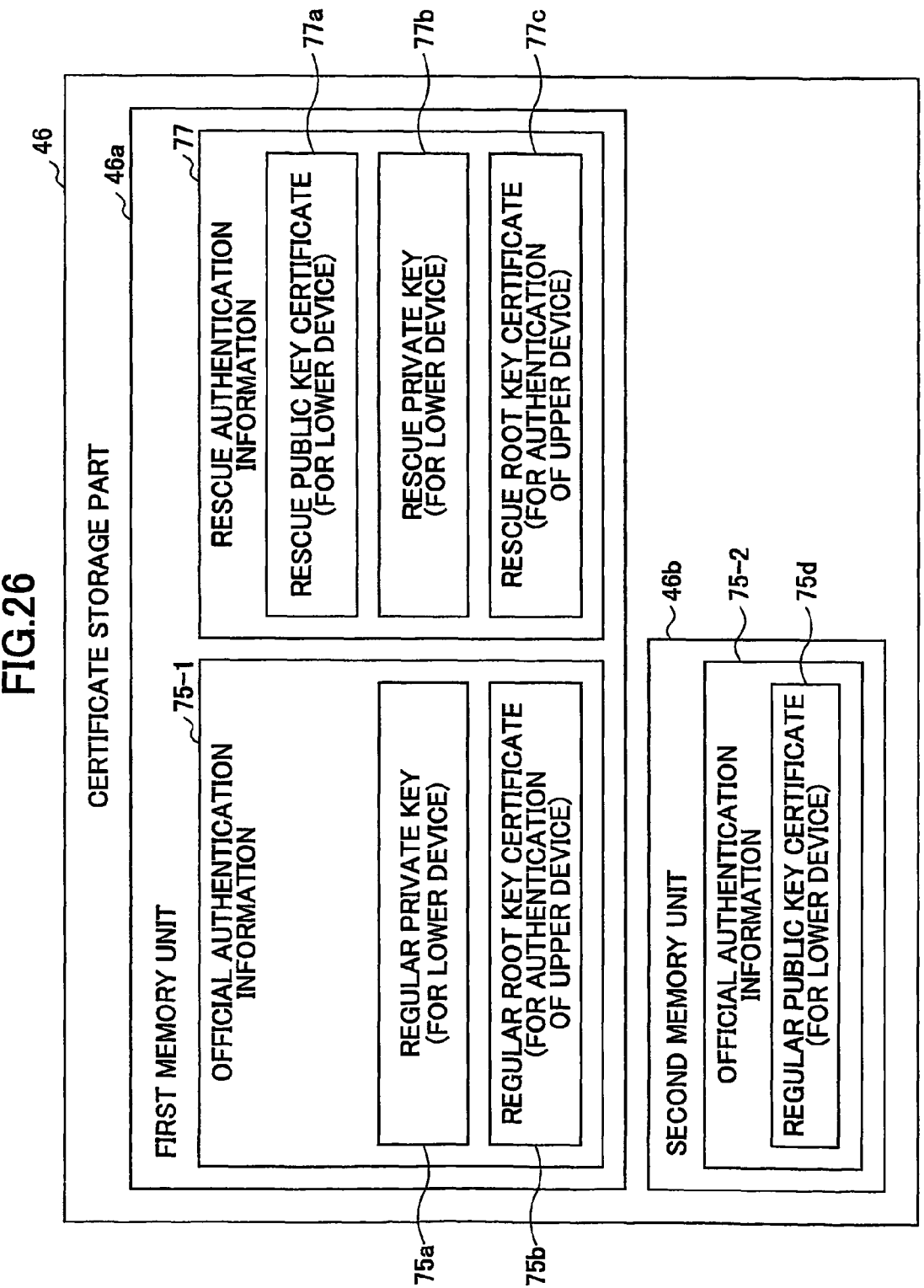
FIG. 26 is a diagram for explaining a further example of a configuration of the certificate storage part of the management subject device shown in FIG. 6, according to the embodiment of the present invention.

As shown in FIG. 26, the regular public key certificate 75*d* for the lower device and a like are stored as official authentication information 75-2 in the second memory unit 46*b*, and are not necessary to be stored in the first memory unit 46*a*. In this case, the regular public key certificate 75*d* and the like stored in the second memory unit 46*b* are used for the authentication process. Even if either one of the first memory unit 46*a* and the second memory unit 46*b* is removed and replaced, the regular public key certificate 75*d* and the like are still stored in another one of the first memory unit 46*a* and the second memory unit 46*b*. This configuration also distributes information concerning the certificate.

The explanation of the certificate storage part 46 of the management subject device 40 is completed.

Also, not only modification described above but also the following modifications can be applied.

First, in the embodiment, the management apparatus 30 includes the function for functioning as the CA, and the management apparatus 30 issues the update certificate by itself. However, the management apparatus 30 and the CA can be separate apparatuses. In this case, it is preferable that the communication path between the management apparatus 30 and the CA is a dedicated line. However, unless a secured communication path is maintained, the SSL, a VPN, or a like, the communication path can be established through the Internet.

In this configuration, for example, after the management apparatus 30 examines a device being a management subject as the sender device of a update public key, and determines that the device passes the examination, the management apparatus 30 requests the CA to issue a update certificate, receives the update certificate from the CA, registers the update certificate to the certificate database, and transfers the update certificate to the management subject device 40.

Moreover, the CA may include the certificate database, and the management apparatus 30 may acquire information concerning the public key certificate and the root key certificate used for the examination from the CA. In this case of acquiring the information from the CA, the management apparatus 30 acquires the information from a location different from the management subject device 40, as described above. In this case, instead of issuing the update certificate by the CA, it is possible for the management apparatus 30 to issue the update certificate by itself.

Furthermore, the function for the examination process included in the management apparatus 30 as described above may be included in the CA. In this case, the management apparatus 30 transfers the device number, the official authentication information, and the like received from the management subject device 40 for the examination toward the CA, causes the CA to conduct the examination process, acquires the update certificate issued by the CA when the examination result shows "OK" and information showing the examination failure when the examination result show "NG" (failure), and transfers the examination result to the management subject device 40. When the management apparatus 30 receives the update certificate, the management apparatus 30 instructs the management subject device 40 to define the update certificate.

Furthermore, in the embodiment, the management apparatus 30 manages the management subject device 40. However, it is not mandatory for a device having the function for examining the communication partner to manage the device of an examination subject. It is possible to apply the present invention to a simple configuration for mutually exchanging data.

Also, in the embodiment, the management apparatus 30 and the management subject device 40 conduct the authentication in accordance with the SSL as described with reference to FIG. 1 or FIG. 3. However, the authentication is not limited to a method using the SSL. Even if another authentication is used, the present invention can still provide similar effects.

A TLS (Transport Layer Security) improving the SSL is well-known, and the present invention can be applied in a case of conducting the authentication process based on the TLS. Also, regarding the public key encryption, not only an RSA (Rivest Shamir Adleman) but also an Elliptic Curve Cryptography or a like can be applied.

In addition, variations describe above can be approximately combined.

Moreover, the program according to the present invention is a program for causing a computer controlling the management apparatus 30 to realize the above-described functions. By causing the computer to execute the program, the above-described effects can be obtained.

The program may be stored in a storage unit such as a ROM or an HDD originally mounted in the computer. Also, the program can be provided by recording to any other recording media such as a CD-ROM, a flexible disk, and non-volatile memories such as the SRAM (Static RAM), an EEPROM (Electronically Erasable and Programmable Read Only Memory), a memory card, and a like. The program recorded in a memory is installed into the computer to cause CPU to execute the program, or the CPU reads out the program from the memory to execute each of processes described above.

Furthermore, the program may be downloaded from an external device with a recording medium recording the program and connected to a network or an external device recording the program in a storage unit to execute the program.

As described above, by the examination apparatus, the communication system, the examination method, the computer-executable program product, or the computer-readable recording medium according to the present invention, it is possible to effectively prevent spoofing even in a case in that it is necessary to identify the communication device by using the public key certificate, which is relatively lower security.

Accordingly, by applying the present invention to a case of operating the communication system 1000 so that each node conducts the authentication process using a digital certificate for communication with each other, it is possible to realize a further secured system.

FIG. 27 is a diagram showing an example of a configuration in that a plurality of management subject devices are arranged in the communication system shown in FIG. 4. In FIG. 27, as above-described, the management apparatus 30 includes a rescue public key certificate 831*a* for the management apparatus 30, a rescue private key 831*b* for the management apparatus 30, a rescue root key certificate 832*a* for the management subject device. Each of a management subject device A 40*a*, a management subject device B 40*b*, a management subject device C 40*c*, and a management subject device D 40*d* includes a rescue public key certificate 731*a* for its device, a rescue private key 731*b* for its device, and a rescue root key certificate 732*a* for authenticating the management apparatus 30. In FIG. 27, meanings of the rescue public key certificate, the rescue private key, and the rescue root key are the same as described above.

The present invention is not limited to the specifically disclosed embodiments, and variations and modifications may be made without departing from the scope of the invention.

The present application is based on Japanese Priority Applications No. 2004-211760 filed on Jul. 20, 2004 and No. 2005-187405 filed on Jun. 27, 2005, the entire contents of which are hereby incorporated by reference.

The invention claimed is:

1. An examination apparatus communicating with a communication device via a network, the examination apparatus comprising:

a first authentication part configured to conduct a first authentication process for communicating with the communication device using first authentication information;

a first communication part configured to establish a communication with the communication device when the first authentication process is successful;

a second authentication part configured to conduct a second authentication process for communicating with the communication device using second authentication information when the first authentication process is not successful;

a second communication part configured to establish the communication with the communication device when the second authentication process is successful;

a receiving part configured to receive third authentication information including identification information for identifying the communication device from the communication device when the communication between the examination apparatus and the communication device is established by the second communication part;

an acquisition part configured to acquire fourth authentication information from a location other than the communication device with reference to the identification information included in the third authentication information;

a processor configured to examine validity of the communication device based on the third authentication information and the fourth authentication information; and a request reception part configured to receive first and second communication requests from the communication device, wherein the first authentication part conducts the first authentication process when the first communication request is received from the communication device, the second authentication part conducts the second authentication process when the first authentication process is not successful and the second communication request is received from the communication device, the request reception part includes a first request reception part configured to receive the first communication request, and a second request reception part configured to receive the second communication request, and the first request reception part is associated with a first URL through which the first communication request is received, the second request reception part is associated with a second URL through which the second communication request is received, and the first URL and the second URL are different.

2. The examination apparatus as claimed in claim 1, further comprising:
a storage part configured to store a correspondence between the identification information of the communication device and a public key used for the authentication process.

3. The examination apparatus as claimed in claim 1, wherein the examination part comprises:
an encryption part configured
to encrypt given data by using either one of the public key acquired by the acquisition part and a private key received by the receiving part,
to decrypt data encrypted by another one of the public key and the private key, and
to conduct the examination based on a decryption result.

4. The examination apparatus according to claim 1, wherein the first authentication information and the second authentication information are received from the communication device.

5. The examination apparatus according to claim 1, wherein the first authentication information is used for authentication of communication, and the second authentication information is used only when the first authentication process is not successful.

6. A communication system, comprising:
a communication device; and
an examination apparatus, wherein
the communication device comprises,
a sending part configured to send third authentication information to the examination apparatus, the third authentication information including identification information of the communication device, and
the examination apparatus comprises,
a first authentication part configured to conduct a first authentication process for communicating with the communication device using first authentication information;
a first communication part configured to establish a communication with the communication device when the first authentication process is successful;
a second authentication part configured to conduct a second authentication process for communicating with the communication device using second authentication information when the first authentication process is not successful;
a second communication part configured to establish the communication with the communication device when the second authentication process is successful;
a receiving part configured to receive the third authentication information including identification information for identifying the communication device from the communication device when the communication between the examination apparatus and the communication device is established by the second communication part;
an acquisition part configured to acquire fourth authentication information from a location other than the communication device with reference to the identification information included in the third authentication information;
a processor configured to examine validity of the communication device based on the third authentication information and the fourth authentication information; and
a request reception part configured to receive first and second communication requests from the communication device, wherein the first authentication part conducts the first authentication process when the first communication request is received from the communication device, the second authentication part conducts the second authentication process when the first authentication process is not successful and the second communication request is received from the communication device, the request reception part includes a first request reception part configured to receive the first communication request, and a second request reception pert configured to receive the second communication request, and the first request reception part is associated with a first URL through which the first communication request is received, the second request reception part is associated with a second URL through which the second communication request is received, and the first URL and the second URL are different.

7. The communication system claimed in claim 6, wherein the examination apparatus further comprises:
a storage part configured to store a correspondence between the identification information of the communication device and a public key used by the communication device for the authentication process.

8. The communication system as claimed in claim 6, wherein the examination part of the examination apparatus comprises:
an encryption part configured
to encrypt given data by using either one of the public key acquired by the acquisition part and a private key received by the receiving part,
to decrypt data encrypted by another one of the public key and the private key, and
to conduct the examination based on a decryption result.

9. An examination method for examining a communication device and communicating with the communication device via a network, said examination method comprising:
conducting a first authentication process for communicating with the communication device using first authentication information;
establishing a communication with the communication device when the first authentication process is successful;
conducting a second authentication process for communicating with the communication device using second authentication information when the first authentication process is not successful;

establishing the communication with the communication device when the second authentication process is successful;

receiving third authentication information including identification information for identifying the communication device from the communication device when the communication between the examination apparatus and the communication device is established in the second authentication process;

acquiring fourth authentication information from a location other than the communication device with reference to the identification information included in the third authentication information;

examining validity of the communication device based on the third authentication information and the fourth authentication information; and receiving first and second communication requests from the communication device, wherein the conducting the first authentication process includes conducting the first authentication process when the first communication request is received from the communication device, the conducting the second authentication process includes conducting the second authentication process when the first authentication process is not successful and the second communication request is received from the communication device, and the receiving first and second communication requests includes receiving the first communication request by a first request reception part, and receiving the second communication request by a second request reception part, the first request reception part being associated with a first URL through which the first communication request is received, the second request reception part being associated with a second URL through which the second communication request is received, and the first URL and the second URL being different.

10. The examination method as claimed in claim 9, further comprising:

storing a correspondence between the identification of the communication device and a public key used by the communication device for the authentication process in an apparatus conducting the receiving a private key, acquiring the public key, and examining the communication device.

11. The examination method as claimed in claim 9, wherein the examining the communication device comprises encrypting given data by using either one of the acquired public key and the received private key received, decrypting data encrypted by another one of the public key and the private key, and conducting the examination based on a decryption result.

12. A computer-readable storage medium having embedded therein instructions, which when executed by a computer, cause the computer to examine a communication device and communicate with the communication device via a network according to a method comprising:

conducting a first authentication process for communicating with the communication device using first authentication information;

establishing a communication with the communication device when the first authentication process is successful;

conducting a second authentication process for communicating with the communication device using second authentication information when the first authentication process is not successful;

establishing the communication with the communication device when the second authentication process is successful;

receiving third authentication information including identification information for identifying the communication device from the communication device when the communication between the examination apparatus and the communication device is established in the second authentication process;

acquiring fourth authentication information from a location other than the communication device with reference to the identification information included in the third authentication information; and examining validity of the communication device based on the third authentication information and the fourth authentication information; and receiving first and second communication requests from the communication device, wherein the conducting the first authentication process when the first communication request is received from the communication device, the conducting the second authentication process when the first authentication process is not successful and the second communication request is received from the communication device, and the receiving first and second communication requests includes receiving the first communication request by a first request reception part, and receiving the second communication request by a second request reception part, the first request reception part being associated with a first URL through which the first communication request is received, the second request reception part being associated with a second URL through which the second communication request is received, and the first URL and the second URL being different.

13. The computer-readable storage medium as claimed in claim 12, further comprising:

storing a correspondence between the identification information of the communication device and a public key used by the communication device for the authentication process.

14. The computer-readable storage medium as claimed in claim 1, further comprising:

encrypting given data by using either one of the acquired public key and the received private key received, decrypting data encrypted by another one of the public key and the private key, and conducting the examination based on a decryption result.

* * * * *